(12) United States Patent
Miyoshi et al.

(10) Patent No.: US 7,583,736 B2
(45) Date of Patent: Sep. 1, 2009

(54) RADIO TRANSMISSION DEVICE, RADIO RECEPTION DEVICE, AND METHOD FOR SELECTING TRANSMISSION CANCELLATION SUBCARRIERS

(75) Inventors: Kenichi Miyoshi, Yokohama (JP); Mitsuru Uesugi, Yokosuka (JP)

(73) Assignee: Panasonic Corporation, Osaka (JP)

( * ) Notice: Subject to any disclaimer, the term of this patent is extended or adjusted under 35 U.S.C. 154(b) by 669 days.

(21) Appl. No.: 10/516,181

(22) PCT Filed: Sep. 9, 2003

(86) PCT No.: PCT/JP03/11476

§ 371 (c)(1),
(2), (4) Date: Nov. 30, 2004

(87) PCT Pub. No.: WO2004/025883

PCT Pub. Date: Mar. 25, 2004

(65) Prior Publication Data

US 2005/0208906 A1    Sep. 22, 2005

(30) Foreign Application Priority Data

Sep. 12, 2002    (JP) ............................. 2002-266396

(51) Int. Cl.
*H04K 1/10*    (2006.01)
*H04L 27/28*    (2006.01)

(52) U.S. Cl. .................. 375/260; 375/295; 375/296; 375/299; 370/204; 370/208; 370/210; 370/343

(58) Field of Classification Search .............. 375/26, 375/295–297, 260, 135, 146, 219, 240, 299; 370/203–206, 208–210, 335, 342–344, 482
See application file for complete search history.

(56) References Cited

U.S. PATENT DOCUMENTS

| | | | | |
|---|---|---|---|---|
| 5,726,978 A | * | 3/1998 | Frodigh et al. | 370/252 |
| 5,907,583 A | * | 5/1999 | Sakoda et al. | 375/260 |
| 6,130,918 A | * | 10/2000 | Humphrey et al. | 375/295 |
| 6,298,463 B1 | * | 10/2001 | Bingeman et al. | 714/786 |
| 6,418,161 B1 | * | 7/2002 | Shively et al. | 375/222 |

(Continued)

FOREIGN PATENT DOCUMENTS

JP    2000 216749    8/2000

(Continued)

OTHER PUBLICATIONS

Huang, Fu-hua, "Evaluation of Soft Output Decoding for Turbo Codes", May 1997, Chapter 3.*

(Continued)

*Primary Examiner*—Mohammad H Ghayour
*Assistant Examiner*—Sophia Vlahos
(74) *Attorney, Agent, or Firm*—Dickinson Wright, PLLC

(57) ABSTRACT

Of systematic bits (S) and parity bits ($P_1$, $P_2$) generated by coding (coding rate R=1/3) transmission bits, subcarriers to which parity bits are mapped are designated as candidates for transmission cancellation and subcarriers not to be transmitted are selected from among those candidates. When this selection is made, a selection pattern which corresponds to minimum peak power of an OFDM symbol is used based on values of parity bits and phase relationship between subcarriers.

13 Claims, 23 Drawing Sheets

U.S. PATENT DOCUMENTS

| | | | |
|---|---|---|---|
| 6,434,119 B1 * | 8/2002 | Wiese et al. | 370/252 |
| 6,456,653 B1 * | 9/2002 | Sayeed | 375/227 |
| 6,654,431 B1 * | 11/2003 | Barton et al. | 375/346 |
| 6,757,299 B1 * | 6/2004 | Verma | 370/482 |
| 7,054,375 B2 * | 5/2006 | Kannan et al. | 375/260 |
| 7,173,961 B2 * | 2/2007 | Vadde | 375/219 |
| 2001/0031014 A1 * | 10/2001 | Subramanian et al. | 375/260 |
| 2002/0105947 A1 | 8/2002 | Kitagawa et al. | |
| 2002/0181489 A1 | 12/2002 | Kitagawa et al. | |

FOREIGN PATENT DOCUMENTS

| | | |
|---|---|---|
| JP | 2001 148678 | 5/2001 |
| JP | 2001 339361 | 12/2001 |
| JP | 2002 044052 | 2/2002 |
| JP | 2003 283460 | 10/2003 |

OTHER PUBLICATIONS

International Search Report dated Dec. 16, 2003.

N. Maeda, et al., "Performance of the Delay Profile Information Channel Based Subcarrier Transmit Power Control Technique for OFDM/FDD Systems," transactions of Institute of Electronics, Information and Communication Engineers, B. vol. J84-B, No. 2, pp. 205-213, Feb. 2001, with Partial English translation.

* cited by examiner

RADIO TRANSMISSION DEVICE, RADIO RECEPTION DEVICE, AND METHOD FOR SELECTING TRANSMISSION CANCELLATION SUBCARRIERS

TECHNICAL FIELD

The present invention relates to a radio transmission apparatus, radio reception apparatus and method of selecting transmission cancellation subcarriers, and more particularly, to a radio transmission apparatus, radio reception apparatus and method of selecting transmission cancellation subcarriers in a radio communication system carrying out error correction coding.

BACKGROUND ART

In the field of radio communication, and mobile communication in particular, a variety of information such as image and data in addition to voice is becoming transmission targets in recent years. Since it is anticipated that the demand for transmission of various contents will increase at an accelerated pace in the future, the necessity for more reliable and faster transmission will further increase. However, when high-speed transmission is carried out in a mobile communication, influences of multipath delay signals cannot be ignored and the transmission characteristic deteriorates due to frequency selective fading.

As one of technologies for handling frequency selective fading, a multicarrier (MC) modulation scheme such as an OFDM (Orthogonal Frequency Division Multiplexing) scheme is becoming a focus of attention. The multicarrier modulation scheme is a technology for realizing high-speed transmission as a result of transmitting data using a plurality of carriers (subcarriers) whose transmission rate is suppressed to an extent that frequency selective fading is not generated. Especially, because a plurality of subcarriers on which data is arranged is orthogonal to one another, the OFDM scheme is a scheme with the highest frequency utilization efficiency among multicarrier modulation schemes and it can be implemented in a relatively simple hardware configuration, and therefore the OFDM scheme is capturing special attention and is now under study from various angles.

As an example of such studies, there is an OFDM scheme which exercises control so as to avoid transmitting subcarriers of low reception quality in anticipation that the peak value (peak power) of transmit power will decrease. Furthermore, in exercising this control, it tries to minimize the deterioration of a BER (Bit Error Rate) by making bits assigned to subcarriers not to be transmitted coincide with bits to be punctured (e.g., see "Performance of the Delay Profile Information Channel based Subcarrier Transmit Power Control Technique for OFDM/FDD Systems" (Noriyuki MAEDA, Seiichi SAMPEI, and Norihiko MORINAGA, transactions of Institute of Electronics, Information and Communication Engineers, B, Vol. J84-B, No. 2, pp. 205-213 (February 2001)).

However, there is a possibility in the above described method that when there are subcarriers not to be transmitted, the number of bits that can be transmitted may be decreased and the error rate characteristic may deteriorate a great deal. Furthermore, it is necessary to transmit position information on the subcarriers not to be transmitted from a base station to mobile stations separately, which reduces the transmission efficiency. Moreover, simply exercising control so as to avoid transmission of subcarriers of low reception quality may contrarily increase peak power depending on a phase relationship between QPSK-modulated subcarriers, etc.

DISCLOSURE OF INVENTION

It is an object of the present invention to provide a radio transmission apparatus, radio reception apparatus and method of selecting transmission cancellation subcarriers capable of reducing peak power while suppressing deterioration of an error rate characteristic.

The present inventor has come to implement the present invention noticing that a parity bit is a bit with a lower degree of importance than a systematic bit and when one bit needs to be removed, removing a parity bit has a smaller influence on the deterioration of an error rate characteristic than removing a systematic bit.

In order to solve the above described problem and attain the above described object, the present invention is characterized in that, of subcarriers to which a symbol made up of only systematic bits or only parity bits or a symbol made up of a mixture of both which are generated by coding transmission bits is mapped, subcarriers not to be transmitted (that is, subcarriers whose transmission is canceled) are selected from among subcarriers to which a symbol made up of only parity bits is mapped. Furthermore, when subcarriers whose transmission is canceled are selected from among subcarriers to which a symbol made up of only parity bits is mapped, the present invention is characterized by selecting a combination of subcarriers which results in the lowest peak power. The present invention is further characterized by not transmitting position information on subcarriers whose transmission is canceled separately. With these features, the present invention allows a radio communication system carrying out error correction coding to reduce peak power while suppressing deterioration of the error rate characteristic. The present invention can also prevent deterioration of transmission efficiency through transmission of position information.

BEST MODE FOR CARRYING OUT THE INVENTION

With reference now to the attached drawings, embodiments of the present invention will be explained in detail below.

Embodiment 1

Figure 1:
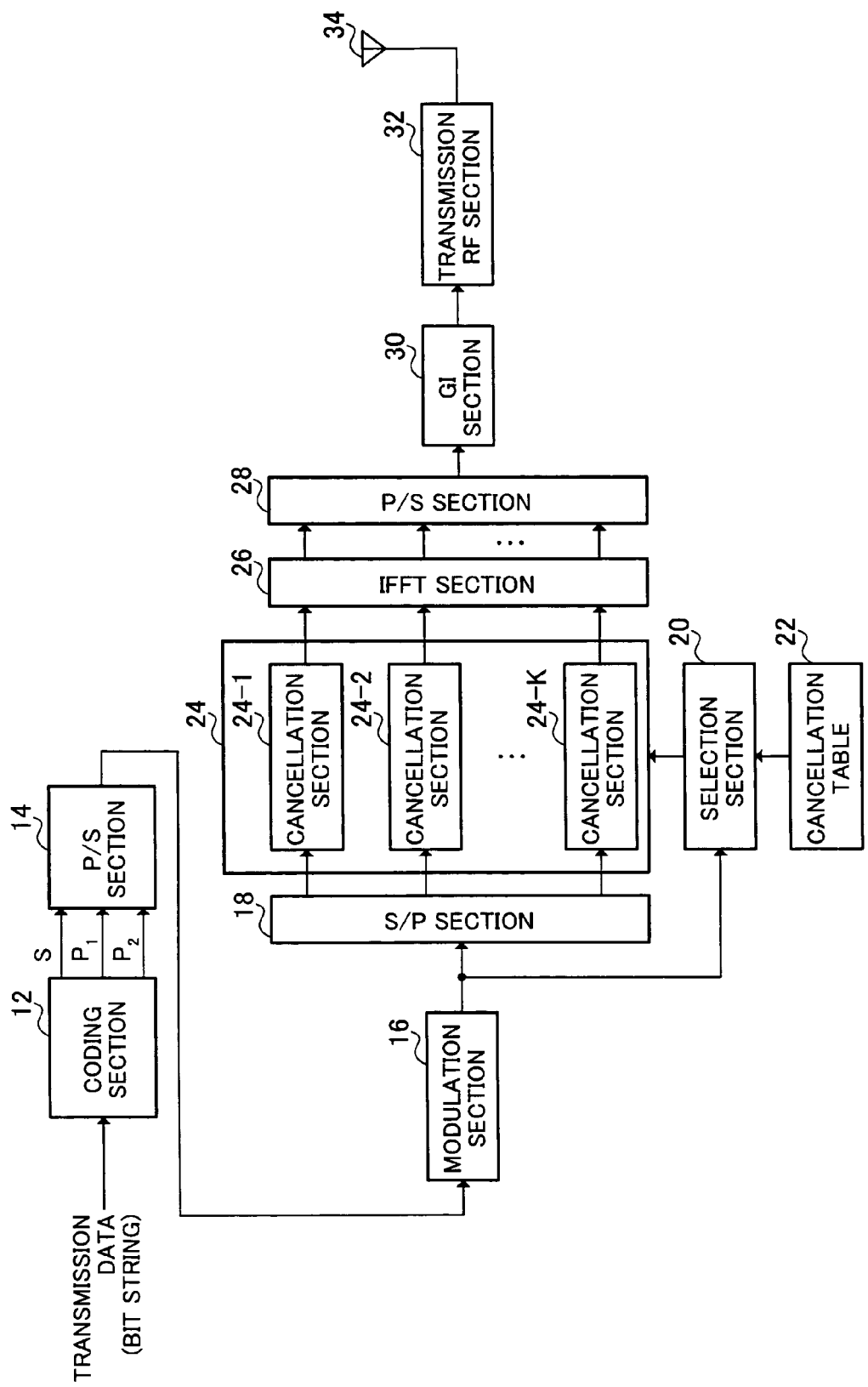
FIG. 1 is a block diagram showing a configuration of a radio transmission apparatus according to Embodiment 1 of the present invention.

FIG. 1 is a block diagram showing a configuration of a radio transmission apparatus according to Embodiment 1 of the present invention. The radio transmission apparatus shown in FIG. 1 includes a coding section 12, a parallel/serial conversion (P/S) section 14, a modulation section 16, a serial/parallel conversion (S/P) section 18, a selection section 20, a cancellation table 22, a cancellation section 24, an inverse fast Fourier transform (IFFT) section 26, a parallel/serial conversion (P/S) section 28, a guard interval (GI) section 30 and a transmission RF section 32, designed to transmit an OFDM symbol of a multicarrier signal in which some of a plurality of subcarriers making up the OFDM symbol are removed. The radio transmission apparatus shown in FIG. 1 is mounted, for example, on a base station apparatus used for a mobile communication system.

In the radio transmission apparatus shown in FIG. 1, the coding section 12 carries out error correction coding on transmission data (a bit string) using systematic codes such as turbo codes. The coding section 12 encodes a transmission bit string using systematic codes and thereby generates systematic bits S which are transmission bits themselves and parity bits P which are redundant bits. Here, to realize a coding rate R=1/3, one systematic bit S and two parity bits $P_1$ and $P_2$ are generated for one transmission bit. The three bits of the systematic bit S and parity bits $P_1$ and $P_2$ are input in parallel to the P/S section 14.

The P/S section 14 converts the bit strings input in parallel to serial bit strings and inputs S, $P_1$ and $P_2$ in that order to the modulation section 16.

The modulation section 16 BPSK-modulates the systematic bit S and parity bits $P_1$ and $P_2$ to generate a symbol. If the input bit is "0", the modulation section 16 modulates it into a symbol of "1" and if the input bit is "1", the modulation section 16 modulates it into a symbol of "−1". Because of the BPSK modulation, 1 symbol consists of 1 bit. The modulated symbols are input to the S/P section 18 and selection section 20.

Every time symbols corresponding to a plurality of subcarriers constituting 1 OFDM symbol are input in series, the S/P section 18 converts those symbols to parallel ones and inputs them to the cancellation section 24. Here, suppose the number of subcarriers constituting 1 OFDM symbol is K=15.

Of the symbols input from the modulation section 16, the selection section 20 decides to which subcarriers the symbols consisting of only parity bits are mapped. Since the modulation section 16 in this embodiment carries out BPSK modulation and 1 symbol consists of 1 bit, the selection section 20 decides subcarriers to which parity bits are mapped. The position of mapping to each subcarrier within 1 OFDM symbol is known for each OFDM symbol beforehand, and therefore the selection section 20 can easily decide subcarriers to which parity bits are mapped. For example, when the number of subcarriers constituting 1 OFDM symbol is K=15 and coding rate R=1/3, it is known beforehand that bit S is mapped to subcarrier $f_1$, bit $P_1$ to $f_2$, bit $P_2$ to $f_3$, bit S to $f_4$, bit $P_1$ to $f_5$, bit $P_2$ to $f_6$, ..., bit S to $f_{13}$, bit $P_1$ to $f_{14}$ and bit $P_2$ to $f_{15}$. When K=15 and R=1/3, the mapping position relationship among S, $P_1$ and $P_2$ is the same for all OFDM symbols. When K is not divisible by R, for example, when K=15 and R=1/4, the mapping position varies from one OFDM symbol to another, but there is certain regularity, and therefore the selection section 20 can easily decide subcarriers to which parity bits are mapped in this case, too. Furthermore, even when coded bits are punctured or interleaved, puncture patterns or interleave patterns are known beforehand, and therefore the selection section 20 can easily decide subcarriers to which parity bits are mapped based on those patterns.

Furthermore, of L subcarriers to which parity bits are decided to be mapped, the selection section 20 selects N subcarriers (L>N) as subcarriers to be excluded from transmission (whose transmission is to be canceled) and indicates the selected subcarriers to the cancellation section 24. In this case, to reduce peak power of OFMD symbols, the selection section 20 references the cancellation table 22 based on the value of a symbol input from the modulation section 16 and selects subcarriers whose transmission is to be canceled. The specific contents of the cancellation table 22 and specific method of selecting subcarrier whose transmission is to be canceled will be described later.

Here, the reason that subcarriers whose transmission is canceled are not subcarriers to which systematic bits are mapped but subcarriers to which parity bits are mapped is as follows. That is, when error correction coding is performed using systematic codes, parity bits can be said to have a lower degree of importance than systematic bits. That is, at a radio reception apparatus which receives OFDM symbols, its error rate characteristic deteriorates considerably when systematic bits are lost, but a desired error rate characteristic can be maintained even if some parity bits are lost. This is attributable to the fact that systematic bits constitute transmission bits themselves, while parity bits are redundant bits.

The cancellation section 24 consists of cancellation sections 24-1 to 24-K. K corresponds to the number of a plurality of subcarriers included in 1 OFDM symbol (here K=15) and the cancellation sections 24-1 to 24-K handle subcarriers $f_1$ to $f_K$ respectively. The cancellation sections 24-1 to 24-K each have a configuration shown in FIG. 2 and the cancellation section corresponding to a subcarrier indicated by the selection section 20 connects a switch to the B side. For example, when the selection section 20 selects the subcarrier $f_2$ as one whose transmission is to be canceled, the cancellation section 24-2 changes the switch from the A side to the B side. When the switch is connected to the B side, a signal with an amplitude value "0" is input to the IFFT section 26 for the subcarrier $f_2$, and therefore the IFFT section 26 obtains a sample value without including subcarrier $f_2$. That is, transmission of the subcarrier $f_2$ is canceled.

The IFFT section 26 applies an inverse fast Fourier transform to symbols or signals with amplitude values "0" input from the cancellation sections 24-1 to 24-K to transform them from a frequency area to a time area and then inputs sample values in the time area to the P/S section 28. As shown above, signals with amplitude values "0" are input from the cancellation sections corresponding to subcarriers selected by the selection section 20 and signals with symbol values "−1" or "1" are input from the other cancellation sections, and therefore the IFFT section 26 performs IFFT using K−N subcarriers other than the subcarriers selected by the selection section 20. The sample values obtained at the IFFT section 26 are input in parallel to the P/S section 28. The P/S section 28 transforms the parallel sample values after the IFFT processing into serial values. In this way, an OFDM symbol which does not include subcarriers selected by the selection section 20 is generated.

With a guard interval added at the GI section 30, the OFDM symbol is subjected to predetermined radio processing such as up-conversion at the transmission RF section 32 and transmitted by radio from the antenna 34.

Figure 3:
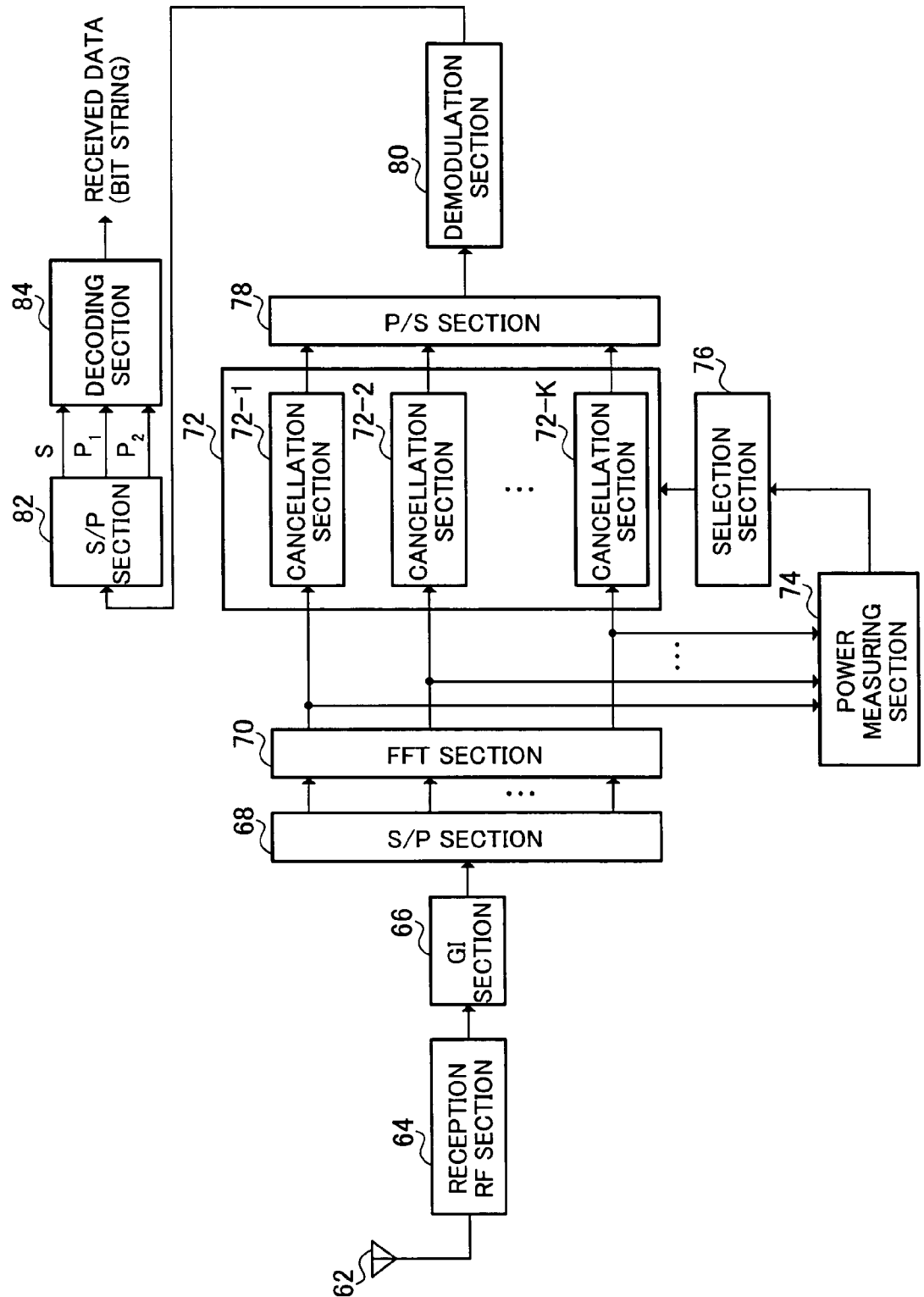
FIG. 3 is a block diagram showing a configuration of a radio reception apparatus according to Embodiment 1 of the present invention.

Then, the configuration of the radio reception apparatus which receives the OFDM symbol transmitted from the radio transmission apparatus shown in FIG. 1 will be explained. FIG. 3 is a block diagram showing a configuration of the radio reception apparatus according to Embodiment 1 of the present invention. The radio reception apparatus shown in FIG. 3 includes an antenna 62, a reception RF section 64, a GI section 66, an S/P section 68, a fast Fourier transform (FFT) section 70, a cancellation section 72, a power measuring section 74, a selection section 76, a P/S section 78, a demodulation section 80, an S/P section 82 and a decoding section 84. The radio reception apparatus shown in FIG. 3 is mounted, for example, on a mobile station apparatus used for a mobile communication system.

In the radio reception apparatus shown in FIG. 3, an OFDM symbol transmitted from the radio transmission apparatus shown in FIG. 1 is received by the antenna 62, subjected to predetermined radio processing such as down-conversion at the reception RF section 64, stripped of the guard interval at the GI section 66 and input to the S/P section 68.

The S/P section 68 serial/parallel-converts signals input in series from the GI section 66 into as many parallel signals as subcarriers and inputs the signals to the FFT section 70.

The FFT section 70 applies a fast Fourier transform (FFT) to the output signals from the S/P section 68 and transforms them from a time area to a frequency area (that is, converts the signals to symbols for the respective subcarriers) and then inputs the symbols to the cancellation section 72 and power measuring section 74.

The power measuring section 74 measures reception power for each subcarrier (reception power of the respective subcarriers $f_1$ to $f_K$) and inputs the measuring result to the selection section 76.

Of the subcarriers $f_1$ to $f_K$, the selection section 76 selects subcarriers to be excluded from demodulation based on the measuring result from the power measuring section 74 and indicates the selected subcarriers to the cancellation sections 72. More specifically, of the subcarriers $f_1$ to $f_K$, the selection section 76 selects N subcarriers having relatively small reception power. This number N is the number N of the subcarriers selected by the radio transmission apparatus as ones whose transmission is canceled and is a preset value. That is, the radio transmission apparatus presets the number N of subcarriers whose transmission is to be canceled and the selection section 76 selects N subcarriers from the lowest reception power as ones to be excluded from demodulation. This allows the radio reception apparatus to select subcarriers whose transmission is canceled without separately transmitting the position information of subcarriers whose transmission is to be canceled from the radio transmission apparatus to the radio reception apparatus, and can thereby prevent deterioration of the transmission efficiency caused by transmission of the position information.

The cancellation section 72 consists of cancellation sections 72-1 to 72-K. K corresponds to the number of a plurality of subcarriers (here K=15) included in 1 OFDM symbol and the cancellation sections 72-1 to 72-K correspond to the subcarriers $f_1$ to $f_K$ respectively. The cancellation sections 72-1 to 72-K each have a configuration shown in FIG. 4 and the cancellation section corresponding to a subcarrier indicated by the selection section 76 connects a switch to the B side. For example, when the selection section 76 selects the subcarrier $f_2$ as one to be excluded from demodulation, the cancellation section 72-2 changes the switch from the A side to the B side. With the switch changed from the A side to the B side, a signal with an amplitude value "0" is input to the demodulation section 80 through the P/S section 78 for the subcarrier $f_2$. In this way, demodulation of the subcarrier $f_2$ is canceled at the demodulation section 80.

The P/S section 78 converts symbols or signals with amplitude values "0" input in parallel from the cancellation sections 72-1 to 72-K to signals in series and inputs them to the demodulation section 80.

The demodulation section 80 BPSK-demodulates the input symbols and inputs them to the S/P section 82. If the input symbol is "1", the demodulation section 80 demodulates it into a bit "0" and if the input symbol is "−1", the demodulation section 80 demodulates it into a bit "1". Furthermore, for a signal with an amplitude value "0", the demodulation section 80 considers it as a bit "0" and inputs it to the S/P section 82. This makes it possible to obtain systematic bit S and parity bits $P_1$ and $P_2$. The parity bits whose transmission is canceled by the radio transmission apparatus become bits "0".

The S/P section 82 converts bits S, $P_1$ and $P_2$ input in that order to parallel bits and inputs those bits to the decoding section 84.

The decoding section 84 carries out error correction decoding such as turbo decoding using the input bits. In this way, received data (bit string) is obtained.

Then, the operations of the radio transmission apparatus in FIG. 1 and radio reception apparatus in FIG. 3 will be explained using FIG. 5 to FIG. 9.

Figure 5:
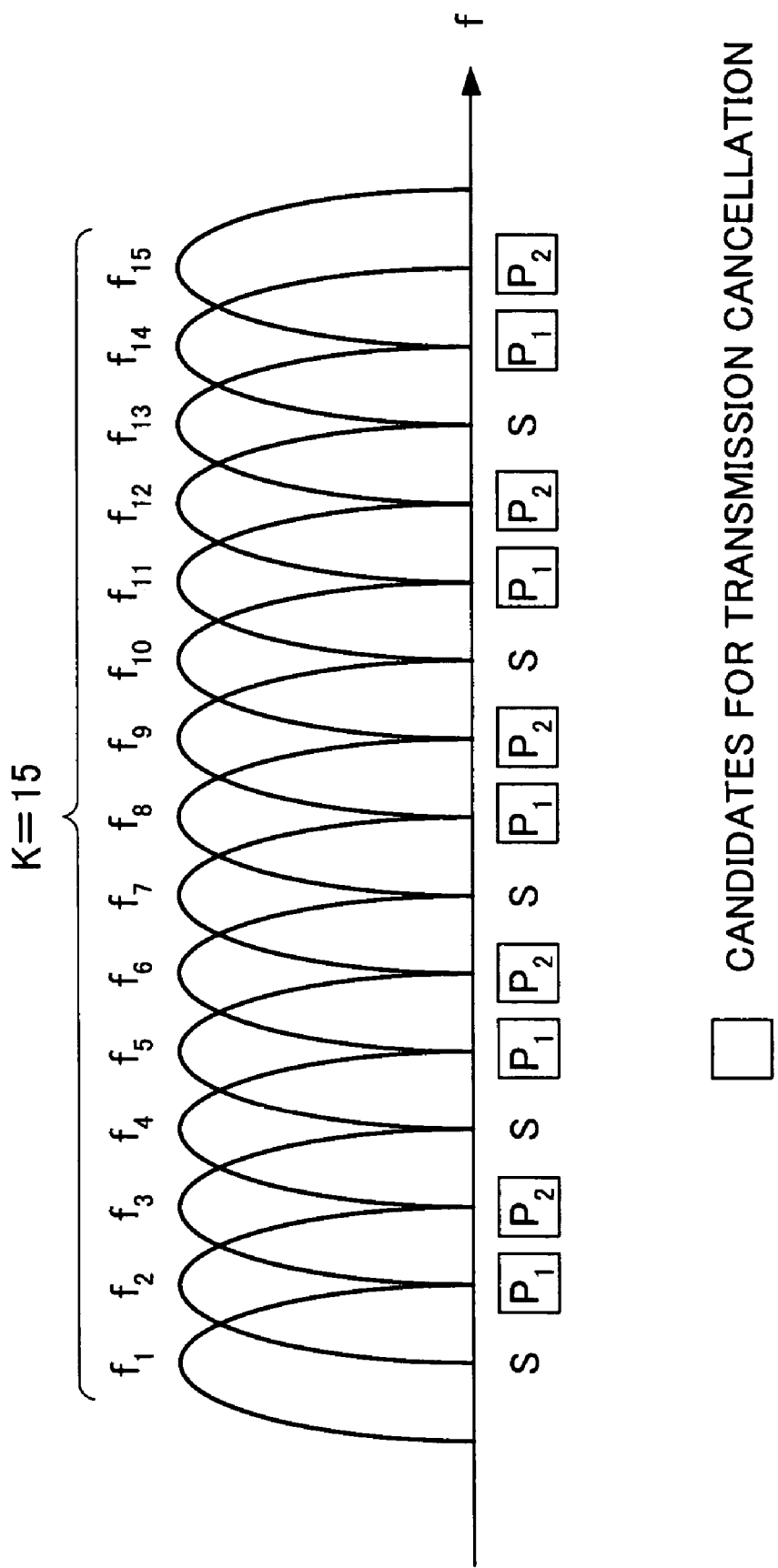
FIG. 5 illustrates a configuration of subcarriers of an OFDM symbol according to Embodiment 1 of the present invention.

As shown in FIG. 5, for example, 1 OFDM symbol consists of K=15 subcarriers $f_1$ to $f_{15}$. In the case of R=1/3 as described above, it is known beforehand that bit S is mapped to subcarrier $f_1$, bit $P_1$ to $f_2$, bit $P_2$ to $f_3$, bit S to $f_4$, bit $P_1$ to $f_5$, bit $P_2$ to $f_6$, ..., bit S to $f_{13}$, bit $P_1$ to $f_{14}$ and bit $P_2$ to $f_{15}$. Of the subcarriers $f_1$ to $f_{15}$, the radio transmission apparatus uses the subcarriers $f_2$, $f_3$, $f_5$, $f_6$, $f_8$, $f_9$, $f_{11}$, $f_{12}$, $f_{14}$ and $f_{15}$ to which parity bits are mapped as candidates for transmission cancellation. When all parity bits are lost, error correction coding becomes meaningless, and therefore only transmission of some of the plurality of parity bits is canceled. Here, of L=10 subcarriers to which parity bits are mapped, transmission of N=5 subcarriers is canceled. This number N is a preset value. Through this transmission cancellation, the coding rate becomes R=1/2.

Figure 6:
FIG. 6 illustrates contents of a cancellation table according to Embodiment 1 of the present invention.
Figure 7:
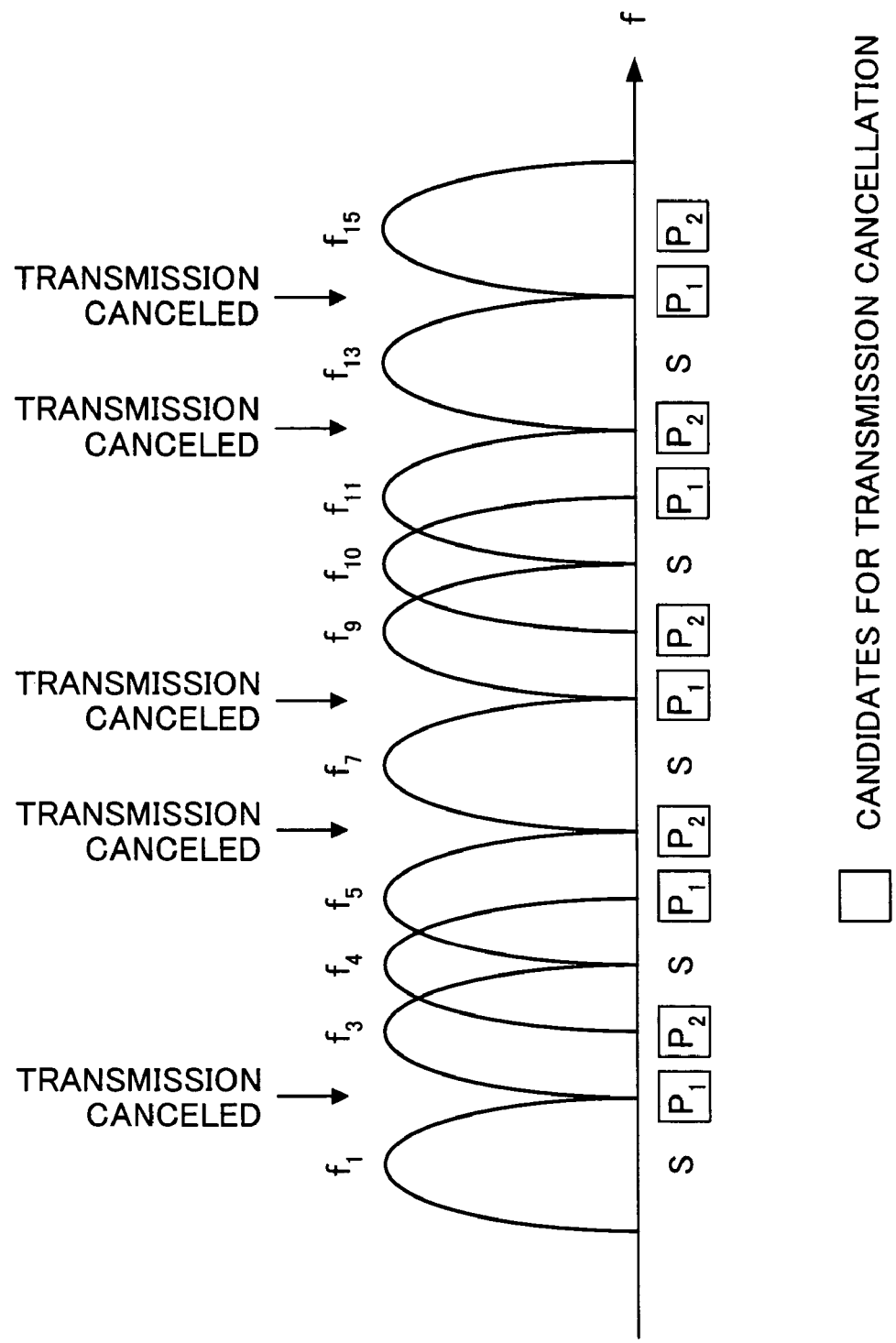
FIG. 7 illustrates subcarriers whose transmission is canceled according to Embodiment 1 of the present invention.

The five subcarriers whose transmission is to be canceled will be selected as follows. FIG. 6 is a cancellation table showing the correspondence between patterns of values of bits mapped to the subcarriers $f_1$ to $f_{15}$ (that is, patterns of values that a modulated symbol possibly takes) and selection patterns of subcarriers selected as ones whose transmission is to be canceled. Since 1 OFDM symbol consists of 15 subcarriers, there are a total of $2^{15}$=32768 patterns of the values of the bits. This table presets subcarriers whose transmission is to be canceled for patterns 1 to 32768. This setting is made based on the magnitude of peak power predicted from values of parity bits and a phase relationship between subcarriers. That is, for the patterns 1 to 32768, selection patterns whose peak power becomes a minimum are preset from among $_{10}C_5$ combinations of subcarriers whose transmission is to be canceled. Then, the radio transmission apparatus references the cancellation table shown in FIG. 6 based on the values of bits mapped to the subcarriers $f_1$ to $f_{15}$ and decides subcarriers whose transmission is to be canceled. For example, when the bit value is pattern 5, if transmission of subcarriers $f_2$, $f_6$, $f_8$, $f_{12}$ and $f_{14}$ out of the subcarrier $f_2$, $f_3$, $f_5$, $f_6$, $f_8$, $f_9$, $f_{11}$, $f_{12}$, $f_{14}$ and $f_{15}$ to which parity bits are mapped is canceled, the peak power of this pattern becomes the least among $_{10}C_5$ selection patterns. When the bit value is pattern 5, the subcarriers after transmission cancellation are as shown in FIG. 7. Therefore, the radio transmission apparatus transmits an OFDM symbol consisting of K−N=10 subcarriers $f_1$, $f_3$, $f_4$, $f_5$, $f_7$, $f_9$, $f_{10}$, $f_{11}$, $f_{13}$ and $f_{15}$ to the radio reception apparatus.

Figure 8:
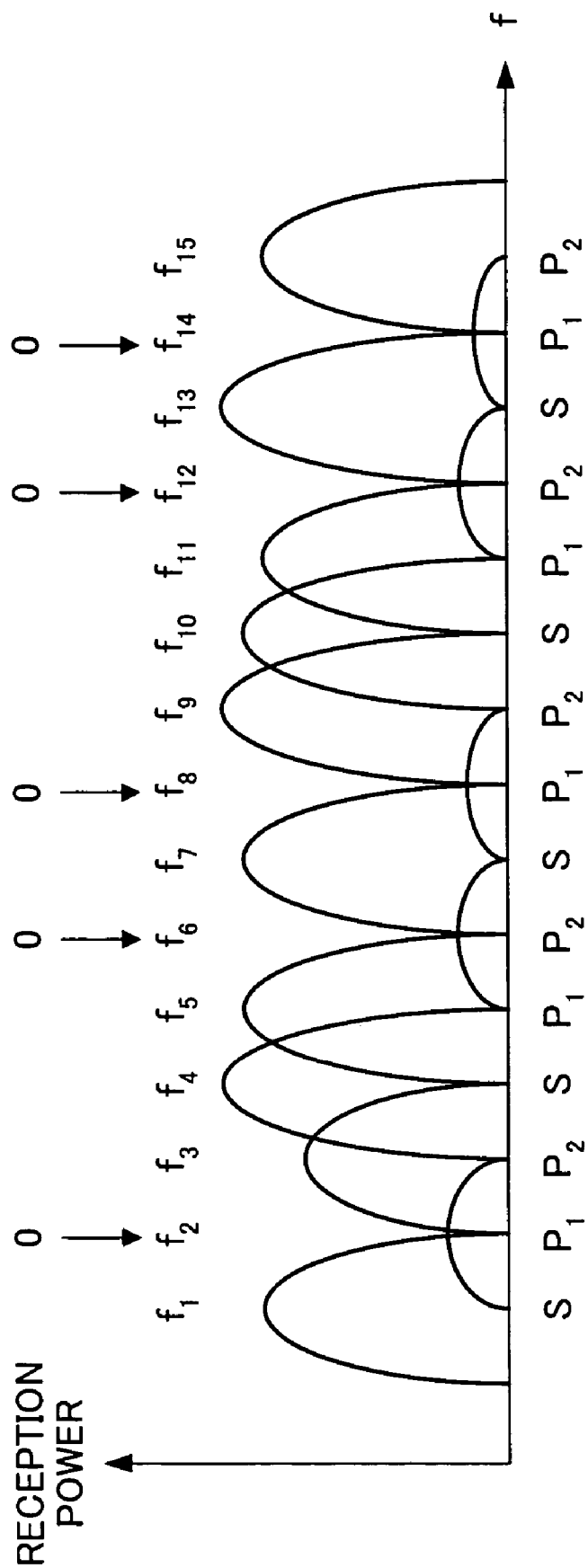
FIG. 8 illustrates reception power of subcarriers according to Embodiment 1 of the present invention.
Figure 9:
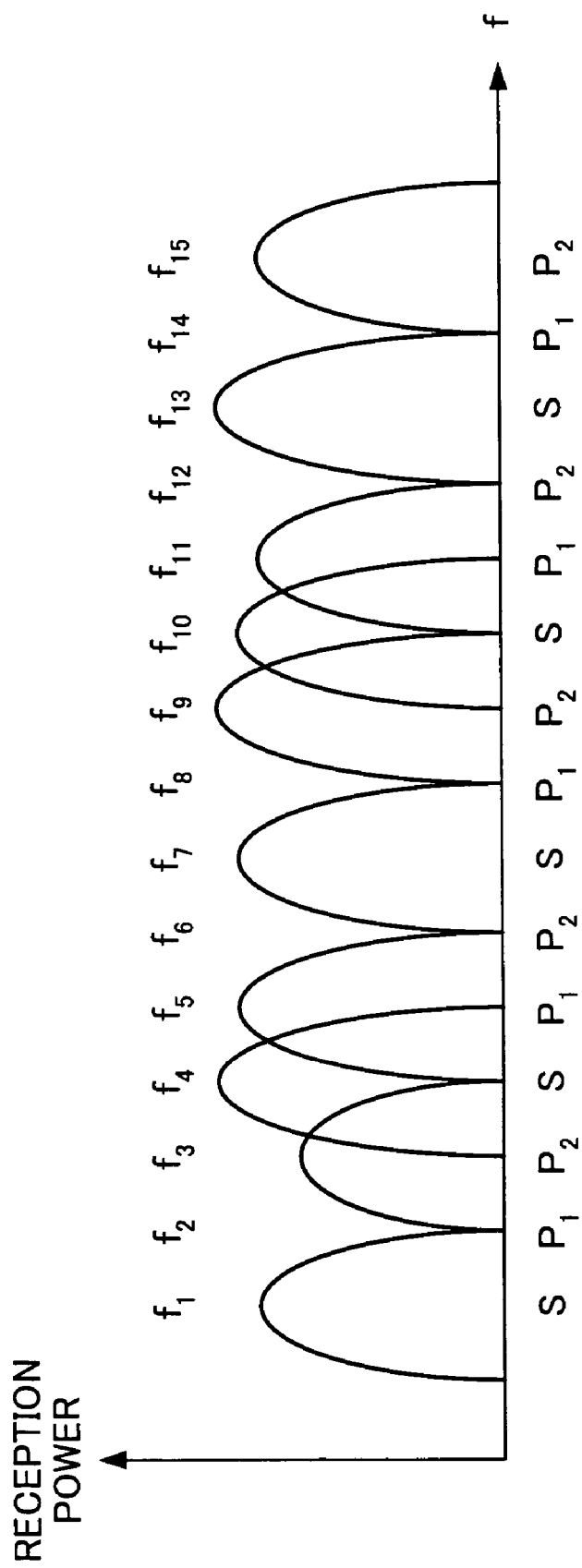
FIG. 9 illustrates subcarriers whose demodulation is to be excluded according to Embodiment 1 of the present invention.

The reception power of the respective subcarriers of the OFDM symbol received by the radio reception apparatus is as shown in FIG. 8. Since transmission of the subcarriers $f_2$, $f_6$, $f_8$, $f_{12}$ and $f_{14}$ is canceled at the radio transmission apparatus, their reception power becomes smaller than that of the other subcarriers. To set N=5 subcarriers as subcarriers to be excluded from demodulation in ascending order of reception power, the radio reception apparatus sets their amplitude values to "0". As a result, the subcarriers appear as shown in FIG. 9. Thus, the radio reception apparatus obtains $P_1$, $P_2$, $P_1$, $P_2$ and $P_1$ as bits "0" which are originally supposed to be mapped to the subcarriers $f_2$, $f_6$, $f_8$, $f_{12}$ and $f_{14}$ and transmitted.

Thus, this embodiment selects subcarriers whose transmission is to be canceled from among subcarriers to which a symbol consisting of only parity bits is mapped. Furthermore, a combination of subcarriers whose peak power becomes a minimum is decided as the combination of subcarriers whose transmission is to be canceled. Therefore, according to this embodiment, it is possible to reduce peak power while suppressing deterioration of the error rate characteristic. Furthermore, position information of subcarriers whose transmission is canceled is not transmitted separately, and it is therefore possible to prevent a reduction of the transmission efficiency caused by transmission of the position information.

Embodiment 2

The radio transmission apparatus according to this embodiment performs transmission cancellation only when peak power of an OFDM symbol reaches or exceeds a threshold. In other words, when peak power is lower than the threshold, all K=15 subcarriers are used to generate an OFDM symbol without transmission cancellation. Furthermore, all combination patterns of subcarriers whose transmission is to be canceled are tried and a pattern corresponding to the minimum peak power is selected.

Figure 10:
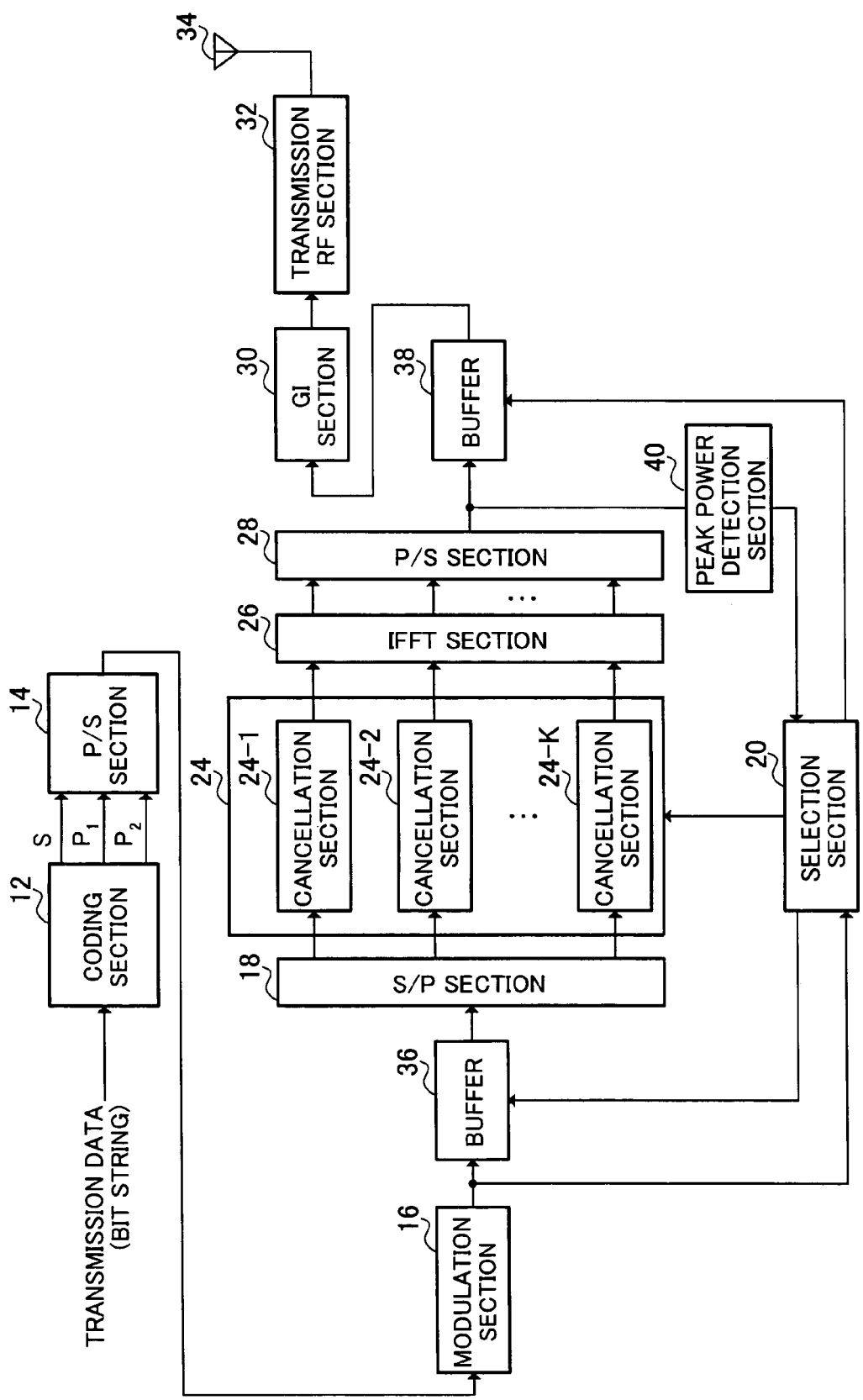
FIG. 10 is a block diagram showing a configuration of a radio transmission apparatus according to Embodiment 2 of the present invention.

FIG. 10 is a block diagram showing a configuration of a radio transmission apparatus according to Embodiment 2 of the present invention. In FIG. 10, the same components as those in Embodiment 1 (FIG. 1) are assigned the same reference numerals and explanations thereof will be omitted.

In the radio transmission apparatus shown in FIG. 10, a buffer 36 stores symbols input from a modulation section 16 in OFDM symbol units. When the number of subcarriers constituting 1 OFDM symbol is K=15, the buffer 36 stores the symbols in sets of 15 subcarriers. A peak power detection section 40 detects peak power of an OFDM symbol input from a P/S section 28. The detected peak power value is input to a selection section 20. Furthermore, a buffer 38 stores OFDM symbols input from the P/S section 28. As in the case of Embodiment 1, when transmission of N=5 subcarriers out of L=10 subcarriers to which parity bits are mapped is canceled, the selection section 20 stores $_{10}C_5$ selection patterns of subcarriers whose transmission is to be canceled.

Figure 2:
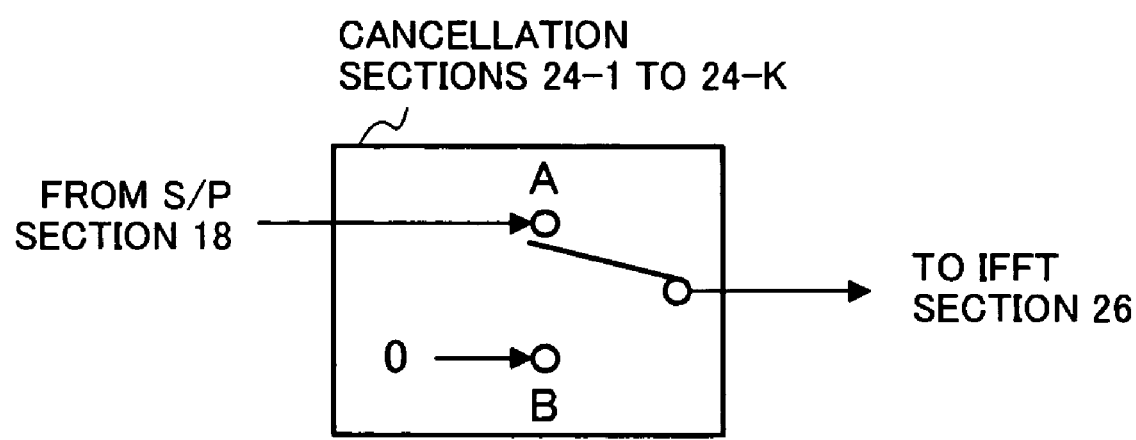
FIG. 2 is a block diagram showing a configuration of a cancellation section of the radio transmission apparatus according to Embodiment 1 of the present invention.

Then, the operation of the radio transmission apparatus shown in FIG. 10 will be explained. First, all switches of the cancellation sections 24-1 to 24-K shown in FIG. 2 are connected to the A side. Therefore, the peak power detection section 40 detects peak power of the OFDM symbol generated using all K=15 subcarriers. When the detected peak power is lower than a threshold, the selection section 20 instructs the buffer 38 to output this OFDM symbol. Therefore, when the peak power of the OFDM symbol is lower than the threshold, the OFDM symbol containing no subcarriers whose transmission is canceled is transmitted to the radio reception apparatus.

Figure 11:
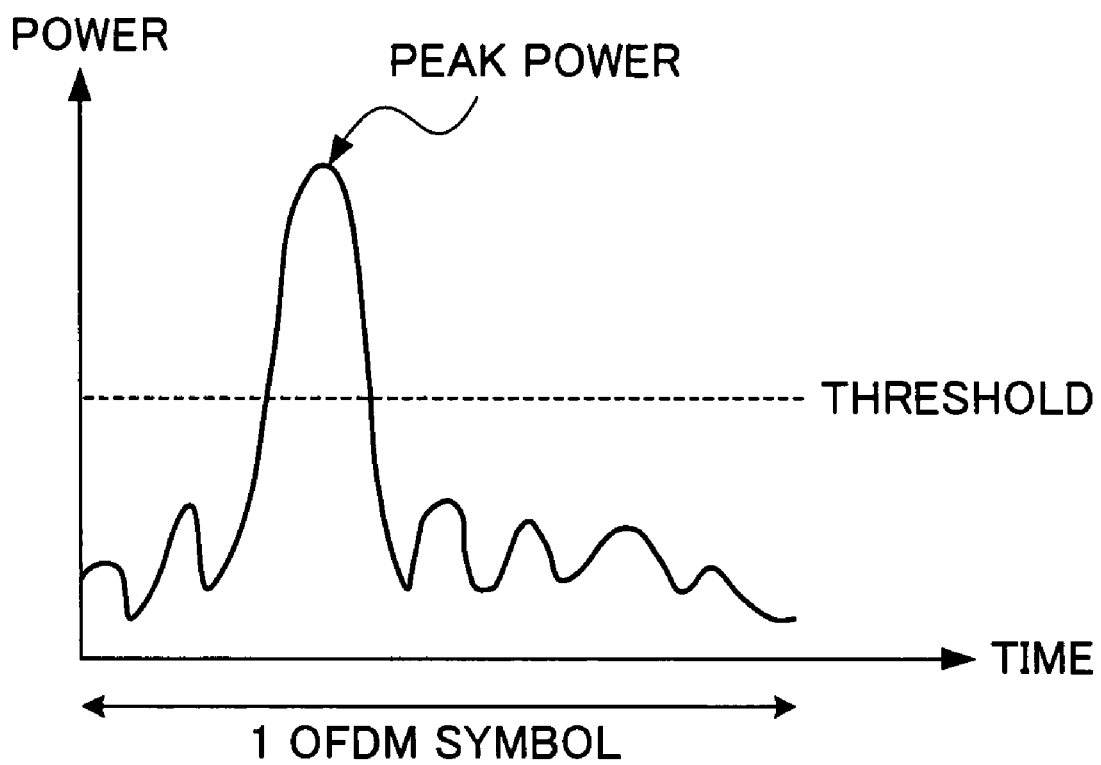
FIG. 11 illustrates peak power according to Embodiment 2 of the present invention.

On the other hand, when the detected peak power reaches or exceeds the threshold as shown in FIG. 11, the selection section 20 instructs the buffer 36 to output a symbol string. The buffer 36 inputs the same symbol string to the S/P section 18 $_{10}C_5$ times per 1 OFDM symbol. Furthermore, only when the detected peak power reaches or exceeds the threshold, the selection section 20 selects N=5 of the L=10 subcarriers to which parity bits are decided to be mapped as ones whose transmission is to be canceled and indicates the selected subcarriers to the cancellation section 24. This selection is carried out on all $_{10}C_5$ selection patterns. Then, every time the selection section 20 carries out selection processing, OFDM symbols whose transmission is canceled in different selection patterns are stored in the buffer 38 and the peak power is detected by the peak power detection section 40. Therefore, the buffer 38 stores $_{10}C_5$ OFDM symbols and the peak power detection section 40 detects peak power Of $_{10}C_5$ OFDM symbols. Then, the selection section 20 selects an OFDM symbol whose peak power is a minimum out of the $_{10}C_5$ OFDM symbols and instructs the buffer 38 to output the selected OFDM symbol. In this way, the OFDM symbol whose peak power is lower than the threshold and whose peak power is a minimum is transmitted to the radio reception apparatus.

In this embodiment, instead of selecting the pattern with the minimum power out of $_{10}C_5$ selection patterns as shown above, it is also possible to adapt the embodiment so as to detect peak power of $_{10}C_5$ selection patterns one by one and transmit an OFDM symbol when the peak power falls below a threshold. By so doing, peak power may not necessarily become a minimum but the peak power can be made smaller than the threshold definitely. Therefore, when peak power only needs to be lower than the threshold, such adaptation makes it possible to reduce the amount of processing required for transmission cancellation and a reduction of peak power.

As shown above, in addition to achieving the same operations and effects as those in Embodiment 1, this embodiment cancels transmission only when peak power of an OFDM symbol reaches or exceeds a threshold, and can thereby omit unnecessary transmission cancellation and consequently further suppress deterioration of the error rate characteristic when peak power is reduced.

Embodiment 3

A radio transmission apparatus according to this embodiment keeps the total transmit power of subcarriers to be transmitted constant.

Figure 12:
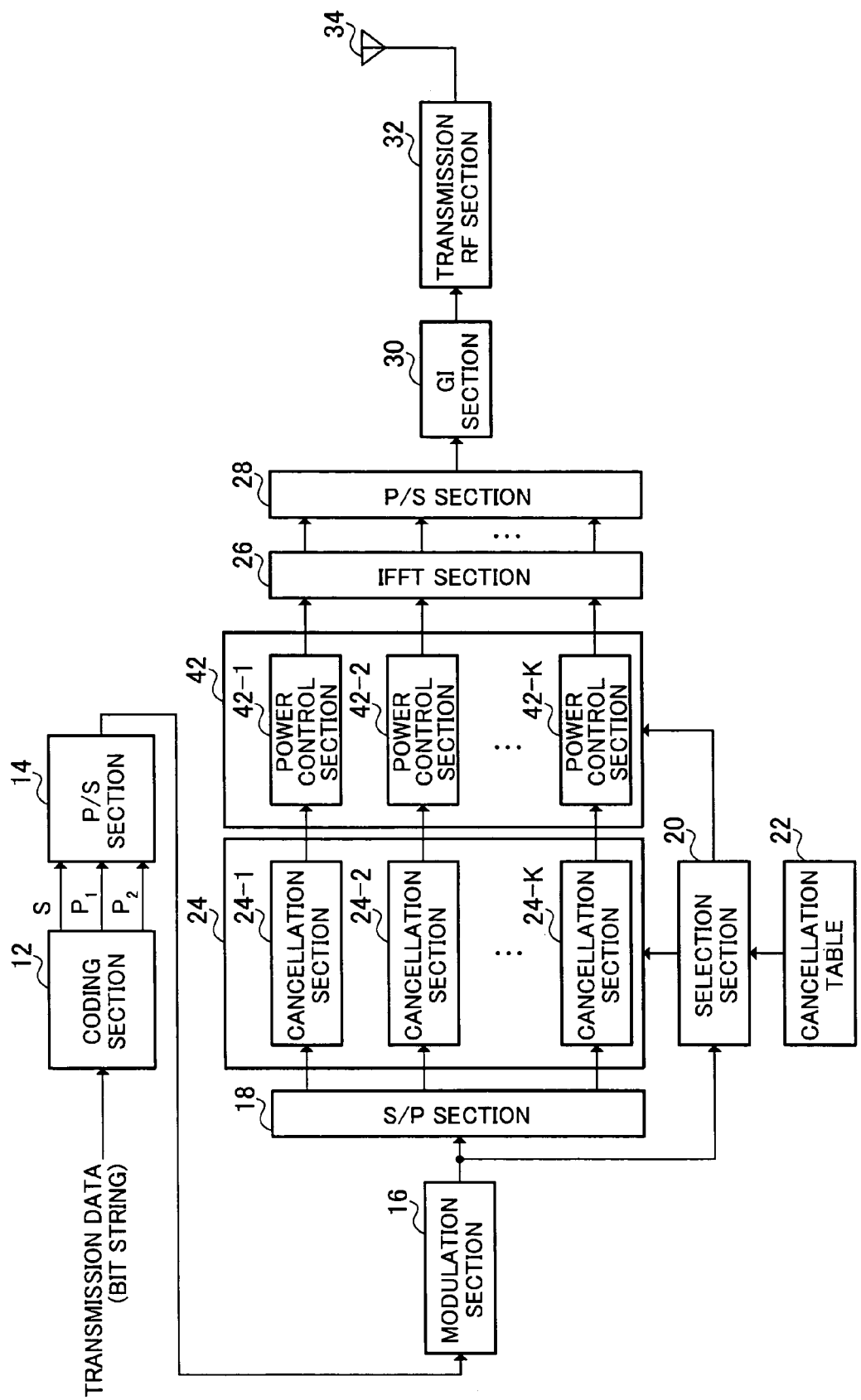
FIG. 12 is a block diagram showing a configuration of a radio transmission apparatus according to Embodiment 3 of the present invention.

FIG. 12 is a block diagram showing a configuration of a radio transmission apparatus according to Embodiment 3 of the present invention. Note that in FIG. 12, the same components as those in Embodiment 1 (FIG. 1) are assigned the same reference numerals and explanations thereof will be omitted.

A selection section 20 indicates N subcarriers selected as ones whose transmission is to be canceled to a cancellation section 24 and a power control section 42.

The power control section 42 consists of power control sections 42-1 to 42-K. K equals the number of a plurality of subcarriers included in 1 OFDM symbol and the power control sections 42-1 to 42-K correspond to subcarriers $f_1$ to $f_K$ respectively. The power control section 42 assigns transmit power corresponding to subcarriers whose transmission is canceled to subcarriers whose transmission is not canceled. That is, the transmit power which decreases because transmission of subcarriers selected by the selection section 20 is canceled is assigned to subcarriers other than subcarriers whose transmission is to be canceled. This assignment is performed more specifically as follows.

When the selection section 20 selects N out of K subcarriers included in 1 OFDM symbol as ones whose transmission is to be canceled, the power control sections corresponding to the N subcarriers indicated by the selection section 20 out of the power control sections 42-1 to 42-K multiply the transmit power of K–N subcarriers (that is, subcarriers which are transmitted) other than subcarriers whose transmission is to be canceled by K/(K–N) respectively. For example, when K=15 and N=5, the transmit power of N=5 subcarriers is multiplied by 1.5 compared to the case where no transmission cancellation is performed. By so doing, it is possible to equally assign transmit power corresponding to the transmit power decrease due to cancellation of transmission of the subcarriers, to subcarriers other than the subcarriers whose transmission is to be canceled.

Thus, this embodiment assigns transmit power corresponding to the transmit power decrease because of cancellation of transmission of the subcarriers to subcarriers other than the subcarriers whose transmission is to be canceled, and can thereby reduce peak power while keeping transmit power of OFDM symbols constant.

Embodiment 4

This embodiment will describe a case where a modulation section 16 modulates two or more bits into 1 symbol.

Figure 13:
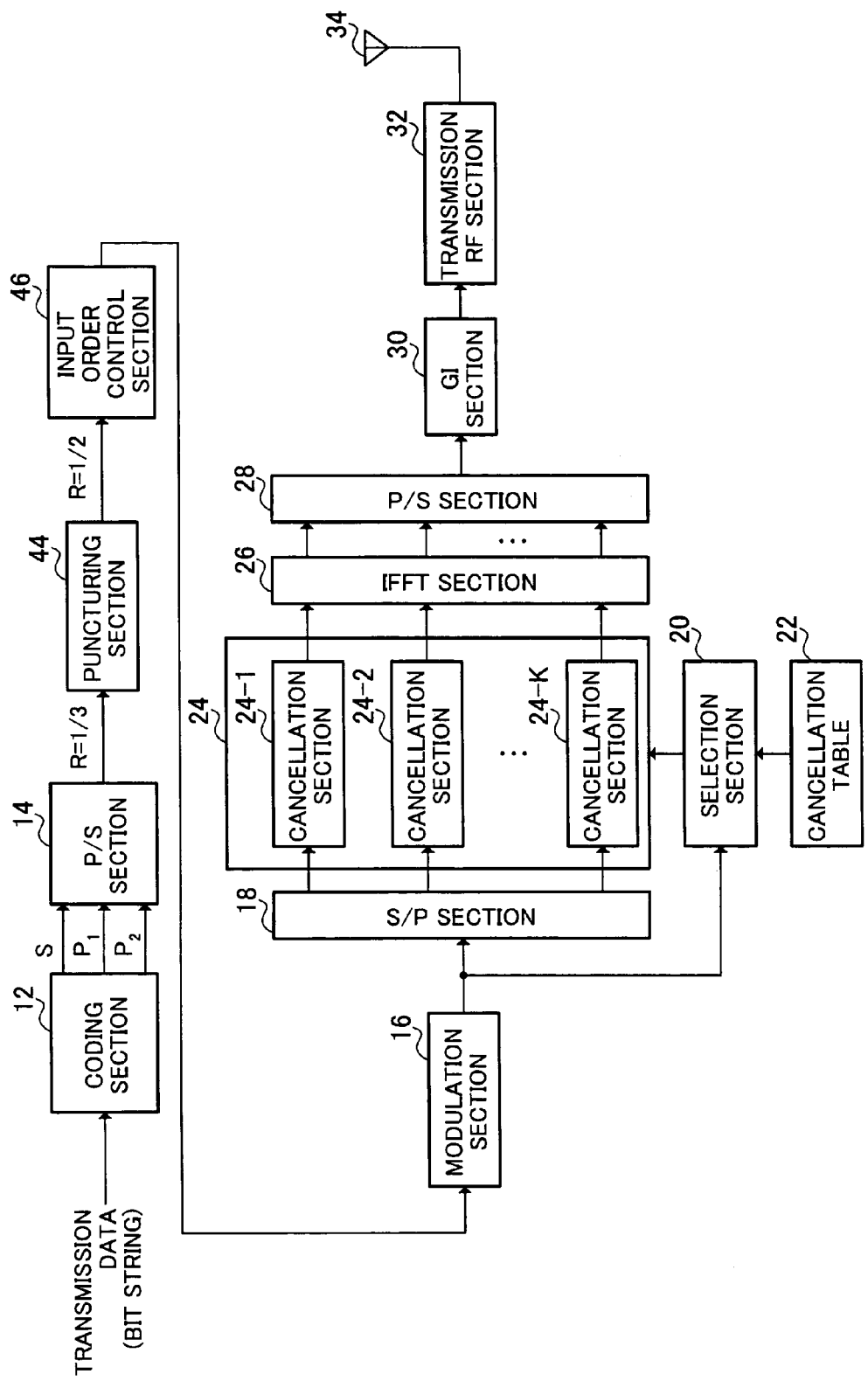
FIG. 13 is a block diagram showing a configuration of a radio transmission apparatus according to Embodiment 4 of the present invention.

FIG. 13 is a block diagram showing a configuration of a radio transmission apparatus according to Embodiment 4 of the present invention. Note that the same components in FIG. 13 as those in Embodiment 1 (FIG. 1) are assigned the same reference numerals and explanations thereof will be omitted.

The modulation section 16 performs QPSK modulation on bits input from an input order control section 46. That is, the modulation section 16 generates 1 symbol for every 2 bits which are input successively.

Figure 14:
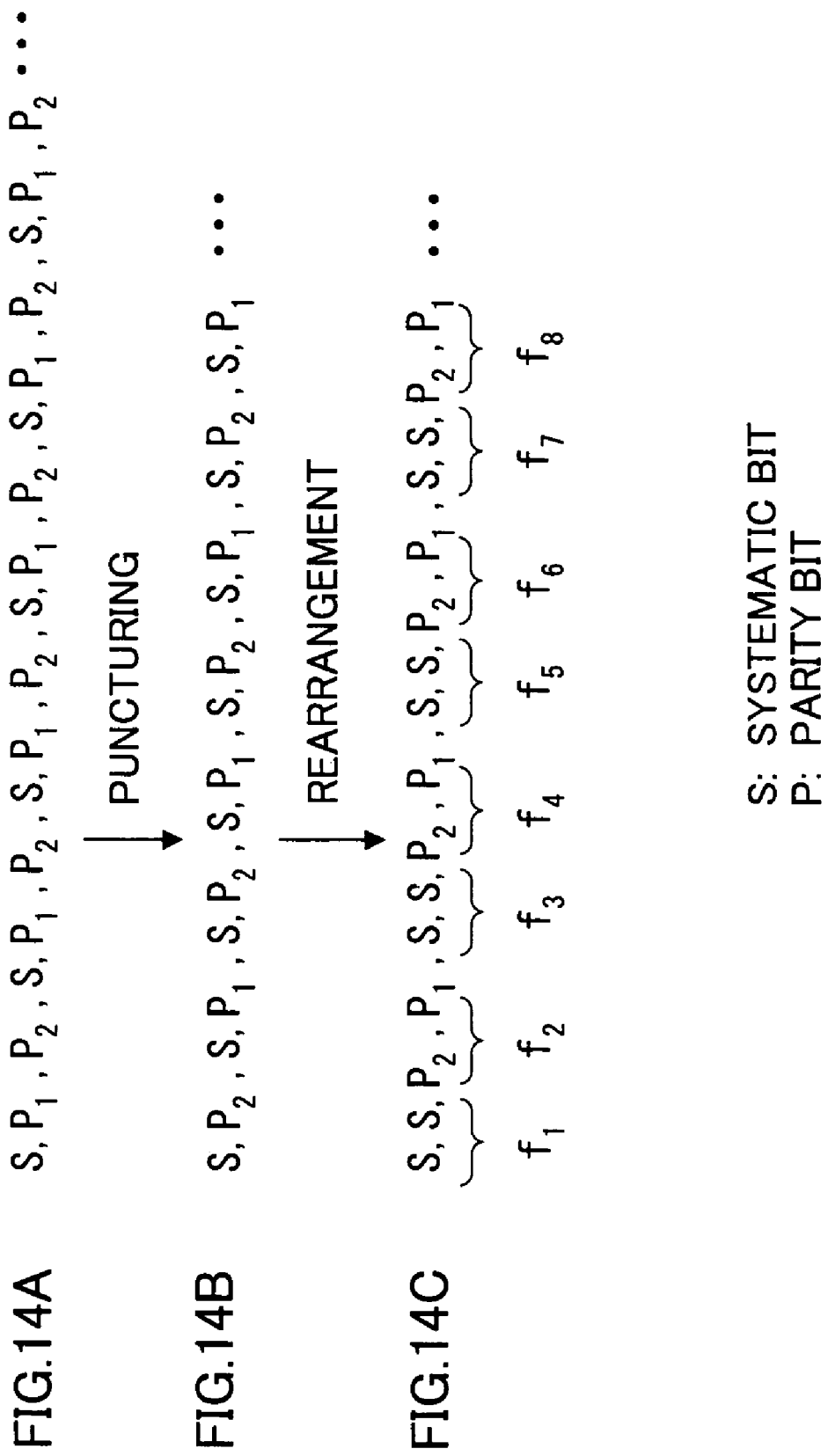
FIG. 14A illustrates a bit string consisting of systematic bits and parity bits according to Embodiment 4 of the present invention.
FIG. 14B illustrates a bit string consisting of systematic bits and parity bits according to Embodiment 4 of the present invention.
FIG. 14C illustrates a bit string consisting of systematic bits and parity bits according to Embodiment 4 of the present invention.

A P/S section 14 outputs bits S, $P_1$, $P_2$ in that order as shown in FIG. 14A. Thus, the coding rate is R=1/3 at this time point.

Here, suppose, for example, that a puncture section 44 performs puncturing to change the coding rate to R=1/2. In this case, the puncture section 44 punctures parity bits. To set the coding rate to R=1/2, it is necessary to make the puncture section 44 output 1 parity bit per 1 systematic bit. Therefore, the puncture section 44 punctures $P_1$ and $P_2$ alternately. As a result, the bit string output from the puncture section 44 is as shown in FIG. 14B. This bit string is input to the input order control section 46.

Here, the modulation section 16 generates 1 symbol for every 2 bits input successively (performs QPSK modulation), and therefore if the bit string in FIG. 14B is input to the modulation section 16 in its original order, no symbol consisting of only parity bits is generated, which makes it impossible to select subcarriers whose transmission is to be canceled.

Therefore, the input order control section 46 rearranges the bit string shown in FIG. 14B as the bit string shown in FIG. 14C. That is, the input order control section 46 controls the order in which the systematic bits and parity bits input from the puncture section 44 are input to the modulation section 16. More specifically, the input order control section 46 performs control in such a way that two parity bits are input successively to the modulation section 16. In this way, in the modulation section 16, symbols consisting of only parity bits are generated.

Figure 15:
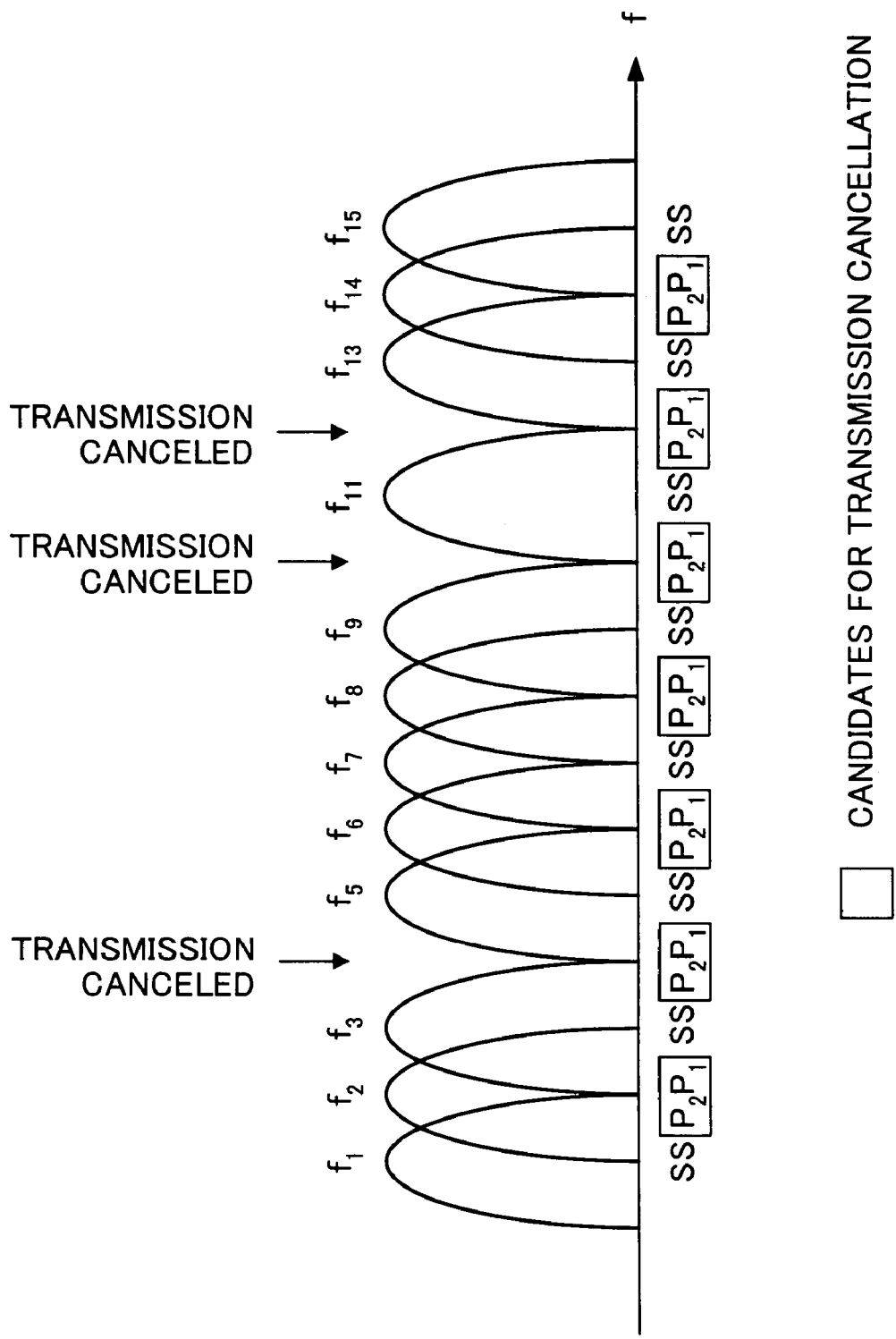
FIG. 15 illustrates subcarriers whose transmission is canceled according to Embodiment 4 of the present invention.

When rearranged as shown in FIG. 14C, symbols consisting of S and S and symbols consisting of $P_2$ and $P_1$ are generated and the respective symbols are mapped to the subcarriers $f_1$ to $f_{15}$. Of the subcarriers to which these symbols are mapped, the selection section 20 selects subcarriers to which symbols consisting of $P_2$ and $P_1$, that is, symbols consisting of only parity bits are mapped as candidates for transmission cancellation (FIG. 15). Then, the selection section 20 cancels transmission of only some of these candidates. In FIG. 15, of the subcarriers $f_2$, $f_4$, $f_6$, $f_8$, $f_{10}$, $f_{12}$ and $f_{14}$ to which symbols consisting of $P_2$ and $P_1$ are mapped, transmission of the subcarriers $f_4$, $f_{10}$ and $f_{12}$ is canceled. This causes the coding rate to be R=2/3.

This embodiment has explained QPSK modulation as an example, but this embodiment is also applicable to modulation schemes whereby three or more bits are modulated into one symbol (8 PSK, 16 QAM, 64 QAM, etc.). For example, in the case where the modulation scheme is 16 QAM, the input order control section 46 performs control in such a way that four parity bits are input successively to the modulation section 16.

As shown above, even when the modulation section modulates two or more bits into 1 symbol, this embodiment can definitely generate subcarriers carrying only parity bits and select subcarriers whose transmission is to be canceled.

Embodiment 5

A radio transmission apparatus according to this embodiment selects subcarriers whose reception power at a radio reception apparatus falls to or below a threshold out of subcarriers to which symbols consisting of only parity bits are mapped as subcarriers whose transmission is to be canceled.

Figure 16:
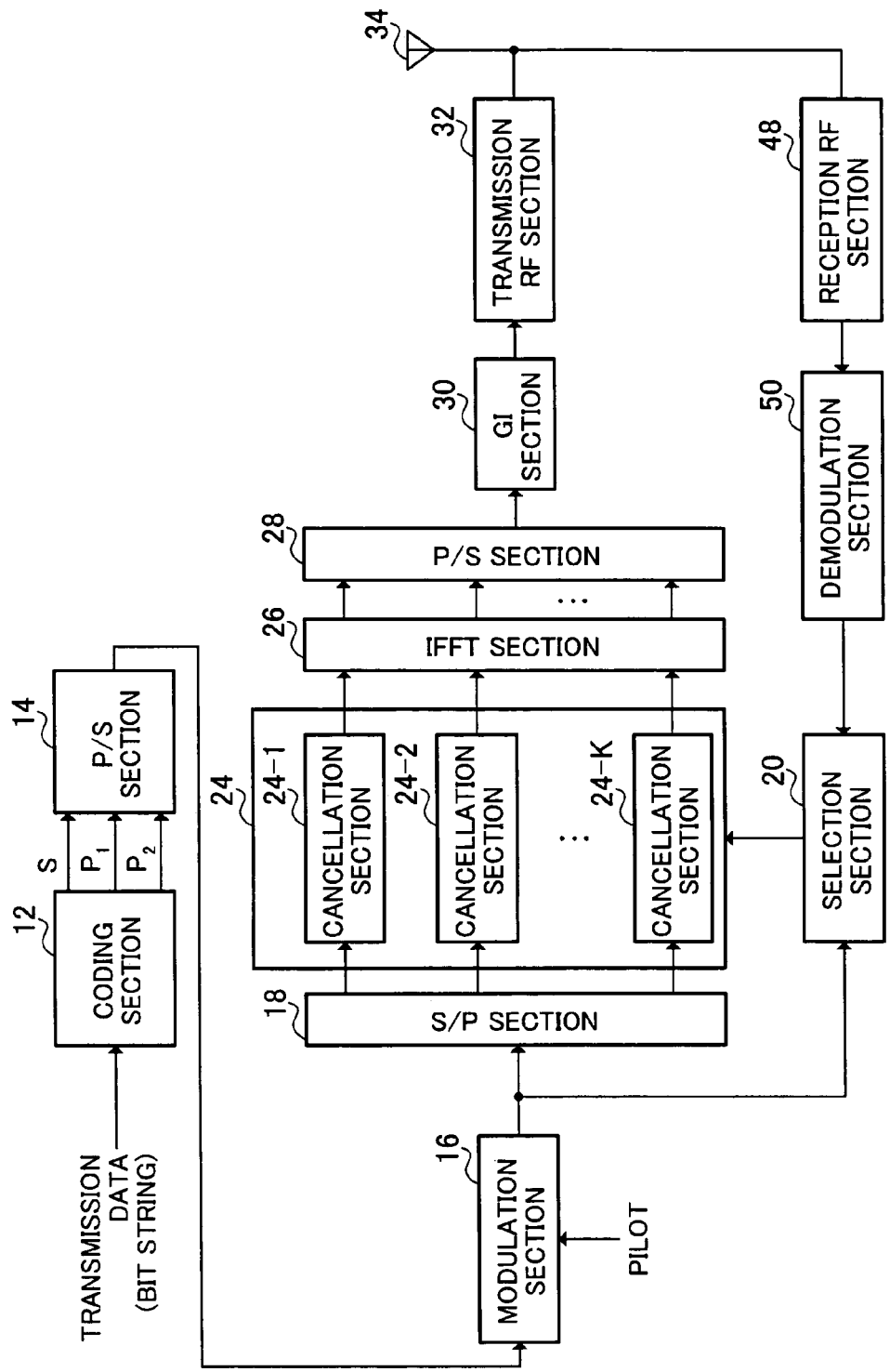
FIG. 16 is a block diagram showing a configuration of a radio transmission apparatus according to Embodiment 5 of the present invention.
Figure 17:
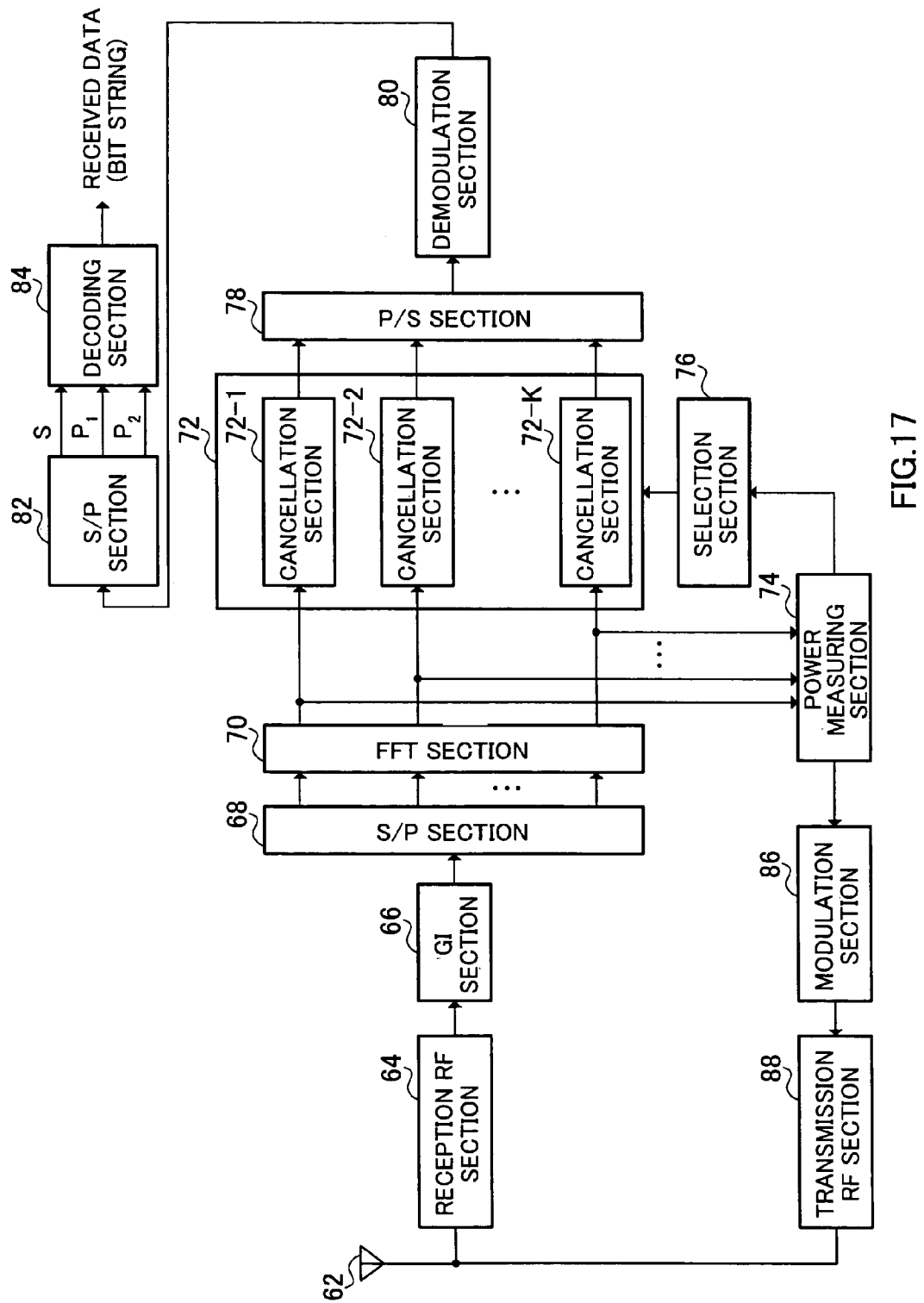
FIG. 17 is a block diagram showing a configuration of a radio reception apparatus according to Embodiment 5 of the present invention.

FIG. 16 is a block diagram showing a configuration of a radio transmission apparatus according to Embodiment 5 of the present invention. Note that the same components in FIG. 16 as those in Embodiment 1 (FIG. 1) are assigned the same reference numerals and explanations thereof will be omitted. Furthermore, FIG. 17 is a block diagram showing a configuration of a radio reception apparatus according to Embodiment 5 of the present invention. Note that the same components in FIG. 17 as those in Embodiment 1 (FIG. 3) are assigned the same reference numerals and explanations thereof will be omitted.

In the radio transmission apparatus shown in FIG. 16, pilot signals are modulated by a modulation section 16, passed through an S/P section 18 and a cancellation section 24, and mapped to subcarriers $f_1$ to $f_{15}$ which constitute 1 OFDM symbol. Then, an OFDM symbol consisting of pilot signals is transmitted to the radio reception apparatus shown in FIG. 17.

In the radio reception apparatus shown in FIG. 17, a power measuring section 74 measures reception power of the subcarriers $f_1$ to $f_{15}$ of the OFDM symbol consisting of pilot signals. Then, the power measuring section 74 inputs notification information for notifying the radio transmission apparatus of a reception power value of each subcarrier to a modulation section 86. This notification information is modulated by the modulation section 86, up-converted by a transmission RF section 88 and transmitted from the antenna 62 to the radio transmission apparatus.

In the radio transmission apparatus shown in FIG. 16, notification information received through an antenna 34 is down-converted by a reception RF section 48 and demodulated by a demodulation section 50. The demodulated notification information is input to a selection section 20. The selection section 20 compares reception power values of the subcarriers $f_1$ to $f_{15}$ with a threshold and selects subcarriers whose reception power values are equal to or lower than the threshold out of subcarriers to which symbols consisting of only parity bits are mapped as subcarriers whose transmission is to be canceled.

Figure 18:
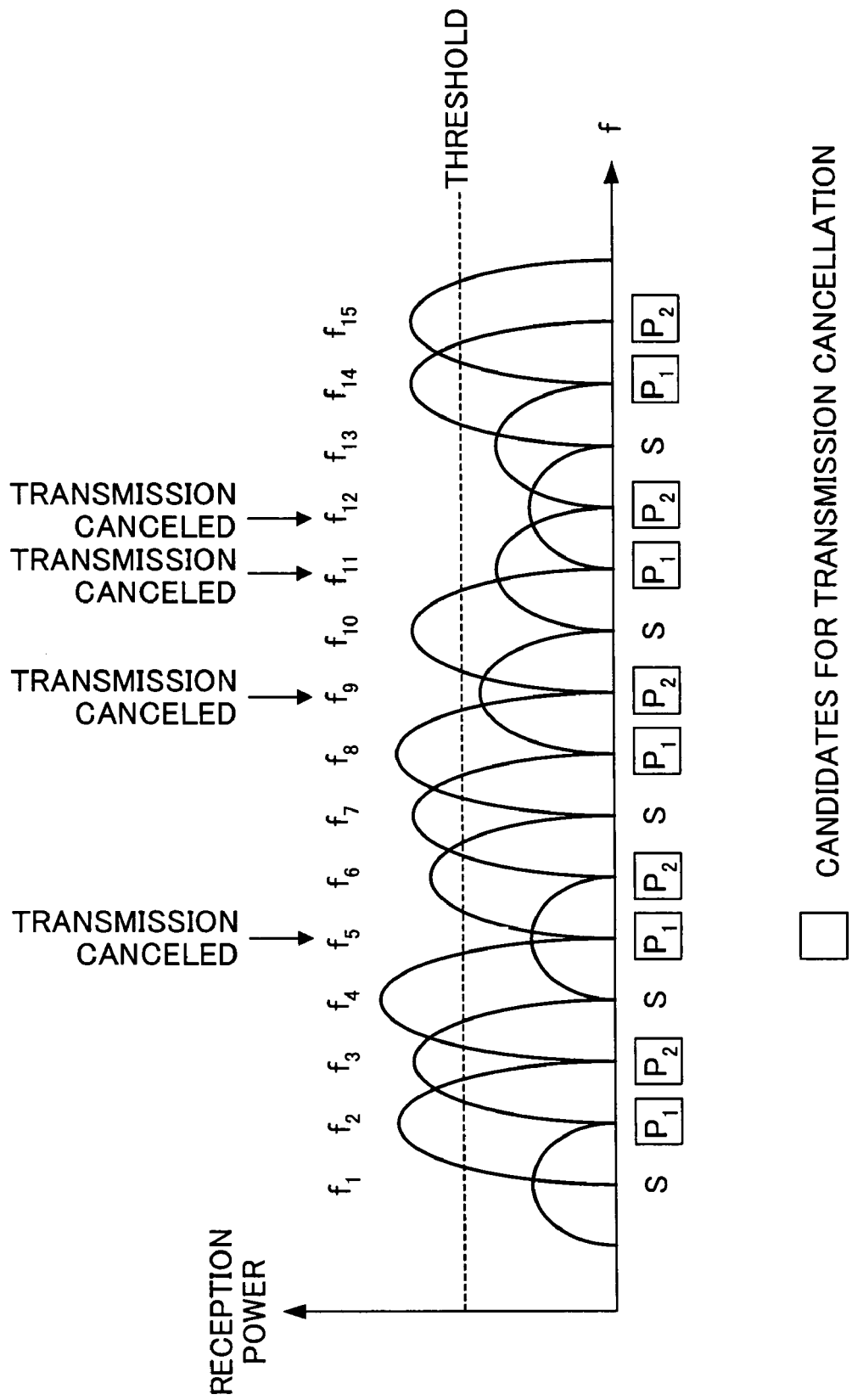
FIG. 18 illustrates subcarriers whose transmission is canceled according to Embodiment 5 of the present invention.

For example, as shown in FIG. 18, when reception power of subcarriers $f_5$, $f_9$, $f_{11}$ and $f_{12}$ out of subcarriers $f_2$, $f_3$, $f_5$, $f_6$, $f_8$, $f_9$, $f_{11}$, $f_{12}$, $f_{14}$ and $f_{15}$ to which parity bits $P_1$ and $P_2$ are mapped falls to or below a threshold, the selection section 20 selects these four subcarriers as subcarriers whose transmission is to be canceled.

Thus, this embodiment does not transmit subcarriers whose reception power at the radio reception apparatus falls to or below a threshold out of subcarriers to which symbols consisting of only parity bits are mapped, and can thereby prevent unnecessary transmission of parity bits which are expected not to be received correctly at the radio reception apparatus.

Embodiment 6

ARQ, and H-ARQ in particular, is a technology for improving an error rate by combining received signal (symbol) for every time retransmission is performed. In order to improve an error rate, the H-ARQ requires a radio reception apparatus to combine received signals. However, when there are subcarriers whose transmission is to be canceled, symbols mapped to those subcarriers are not transmitted and if transmission of the same subcarriers as those at the time of initial transmission is also canceled at the time of retransmission, the symbols mapped to the subcarriers are not transmitted at the time of retransmission either. This means that there exist symbols that cannot be combined at the radio reception apparatus and the error rate will not improve at all no matter how many times retransmission may be performed. Therefore, the radio transmission apparatus according to this embodiment selects different subcarriers between the time of initial transmission and the time of retransmission from among the subcarriers to which symbols consisting of only parity bits are mapped as the subcarriers whose transmission is to be canceled in a communication system which carries out H-ARQ (Hybrid Automatic Repeat reQuest).

Figure 19:
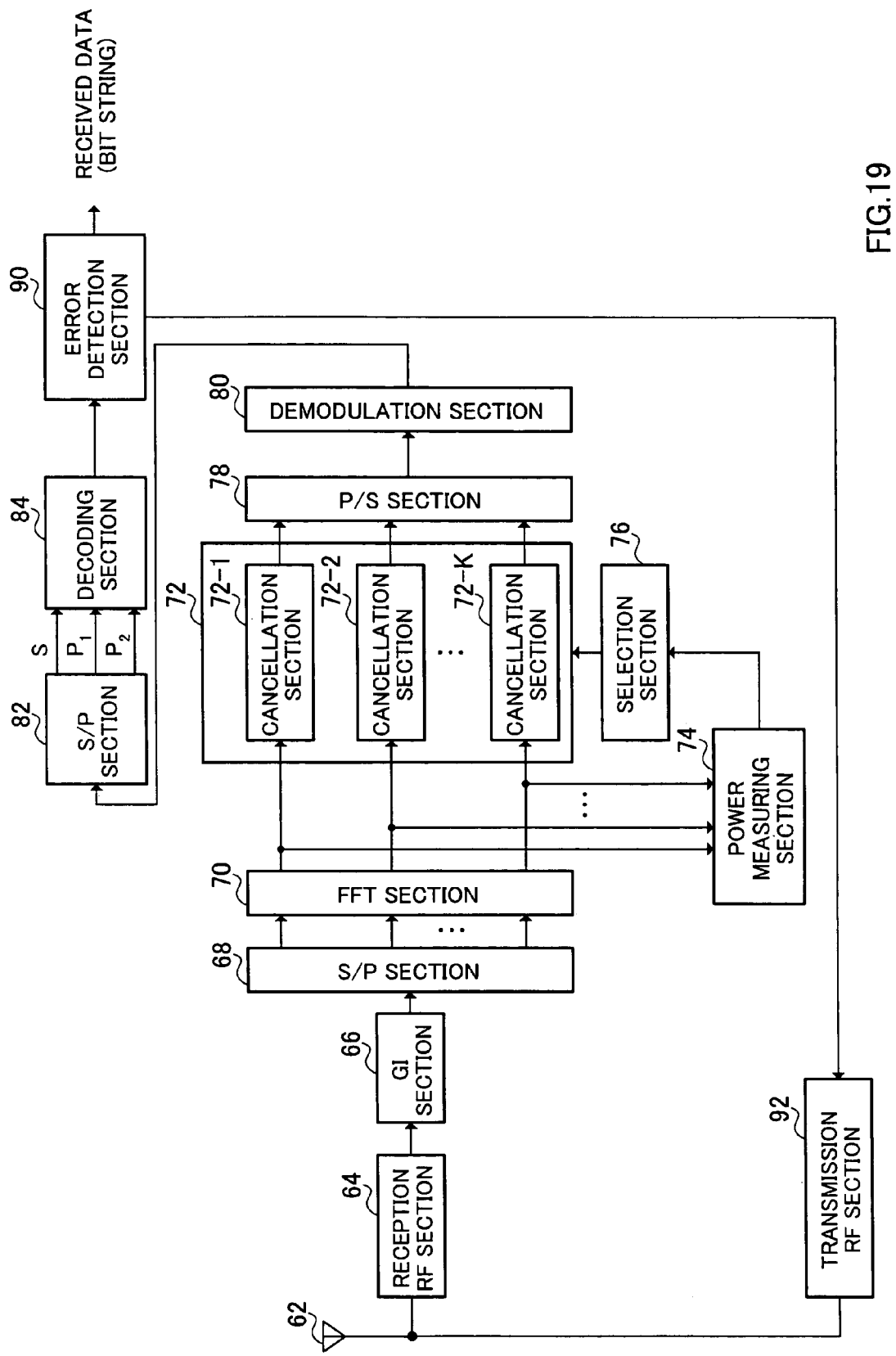
FIG. 19 is a block diagram showing a configuration of a radio reception apparatus according to Embodiment 6 of the present invention.
Figure 20:
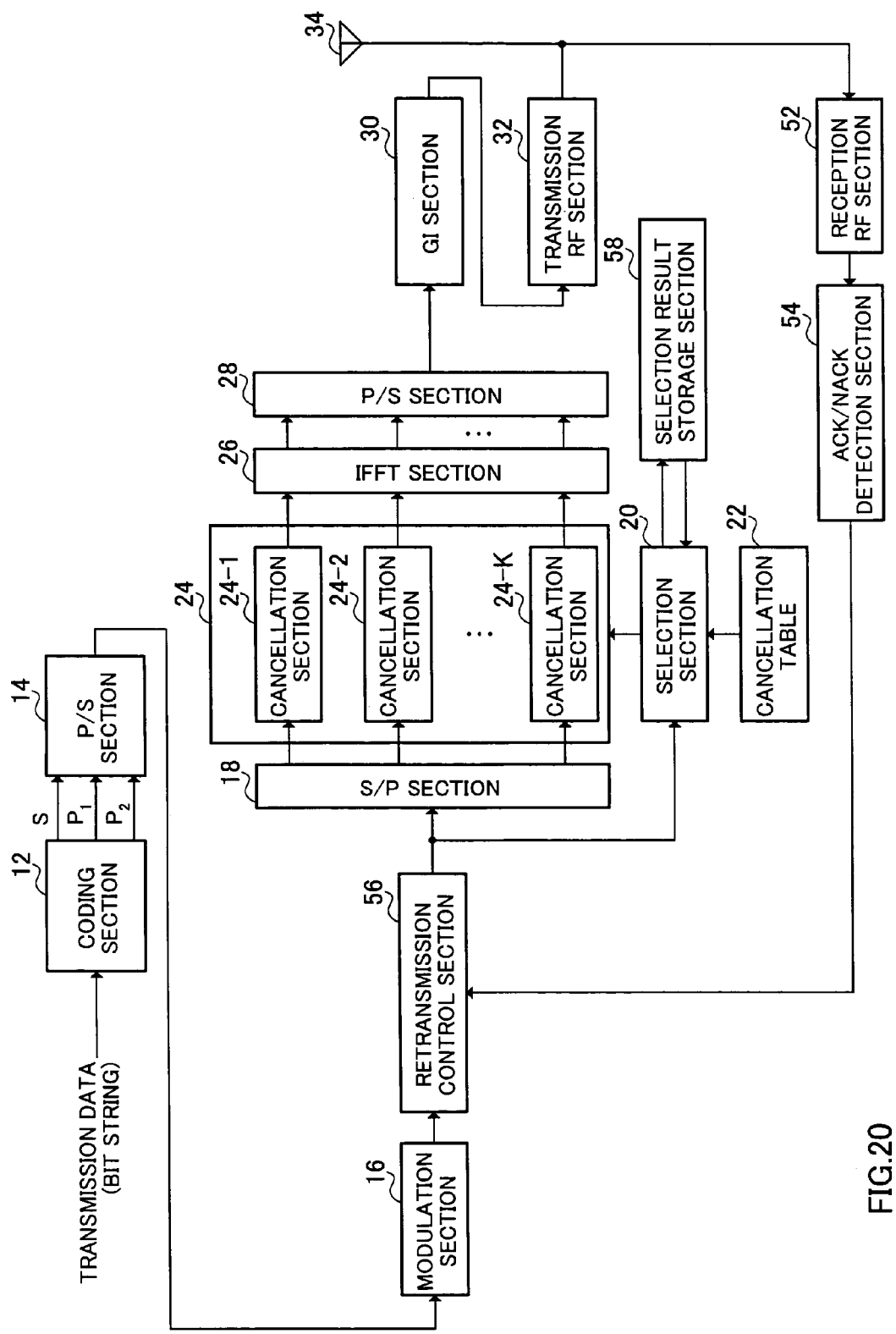
FIG. 20 is a block diagram showing a configuration of a radio transmission apparatus according to Embodiment 6 of the present invention.

FIG. 19 is a block diagram showing a configuration of a radio reception apparatus according to Embodiment 6 of the present invention. In FIG. 19, the same components as those in Embodiment 1 (FIG. 3) are assigned the same reference numerals and explanations thereof will be omitted. Furthermore, FIG. 20 is a block diagram showing a configuration of a radio transmission apparatus according to Embodiment 6 of the present invention. In FIG. 20, the same components as those in Embodiment 1 (FIG. 1) are assigned the same reference numerals and explanations thereof will be omitted.

In the radio reception apparatus shown in FIG. 19, a decoding result (bit string) obtained by a decoding section 84 is input to an error detection section 90. The error detection section 90 carries out error detection such as CRC (Cyclic Redundancy Check) on the input decoding result. Then, the error detection section 90 generates an ACK (ACKnowledgment: positive response) or NACK (Negative ACKnowledgment: negative response) based on the error detection result and inputs it to a transmission RF section 92. The error detection section 90 generates an ACK when the decoding result is OK with no error or generates a NACK when the decoding result is NG with some error as a response signal to the error detection and inputs it to a transmission section 92. The transmission section 92 transmits ACK/NACK to the radio transmission apparatus shown in FIG. 20 through an antenna 62.

At the radio transmission apparatus shown in FIG. 20, a signal including the ACK or NACK transmitted from the radio reception apparatus shown in FIG. 19 is received by an antenna 34, subjected to predetermined radio processing such as down-conversion at the reception RF section 52 and input to an ACK/NACK detection section 54. The ACK/NACK detection section 54 detects the ACK or NACK from the input signal and inputs it to a retransmission control section 56. Symbols generated by a modulation section 16 are input to the retransmission control section 56. The retransmission control section 56 stores symbols input from the modulation section 16 and at the same time inputs the symbols to an S/P section 18 and a selection section 20. Then, when a NACK is input from the ACK/NACK detection section 54, the retransmission control section 56 retransmits a symbol corresponding to the NACK. The retransmitted symbol is also input to the S/P section 18 and selection section 20.

Figure 21:
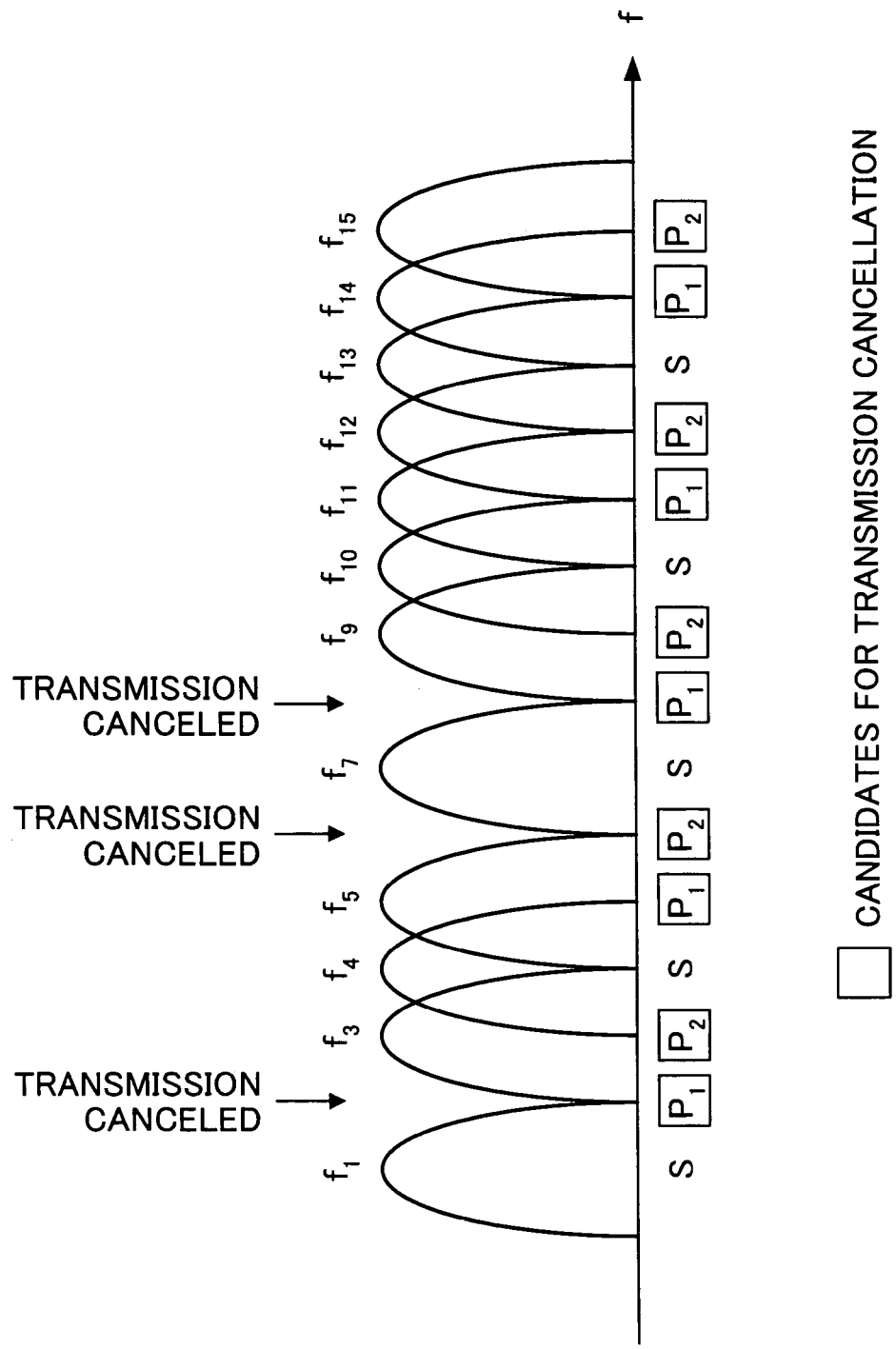
FIG. 21 illustrates subcarriers whose transmission is canceled according to Embodiment 6 of the present invention (at the time of initial transmission)

At the time of initial transmission, the selection section 20 performs the same operation as that in Embodiment 1 and stores the selection result in a selection result storage section 58. Then, at the time of first retransmission, the selection section 20 references the selection result at the time of initial transmission stored in the selection result storage section 58 and selects subcarriers different from the subcarriers at the time of initial transmission as subcarriers to be excluded from transmission. This selection result is also stored in the selection result storage section 58. Furthermore, at the time of second retransmission, the selection section 20 references the selection result at the time of initial transmission and the selection result at the time of first retransmission stored in the selection result storage section 58 and selects subcarriers different from the subcarriers at the time of initial transmission and at the time of first retransmission as subcarriers to be excluded from transmission. That is, the subcarriers selected by the selection section 20 at the time of retransmission as subcarriers whose transmission is to be canceled are selected from among subcarriers other than the already selected subcarriers. In other words, subcarriers selected at the time of retransmission as subcarriers whose transmission is to be canceled are selected only from among the subcarriers already transmitted before the time of retransmission. This will be explained more specifically using FIG. 21 to FIG. 23 below. FIG. 21 shows a case at the initial transmission, FIG. 22 shows a case at the first retransmission and FIG. 23 shows a case at the second retransmission.

Figure 22:
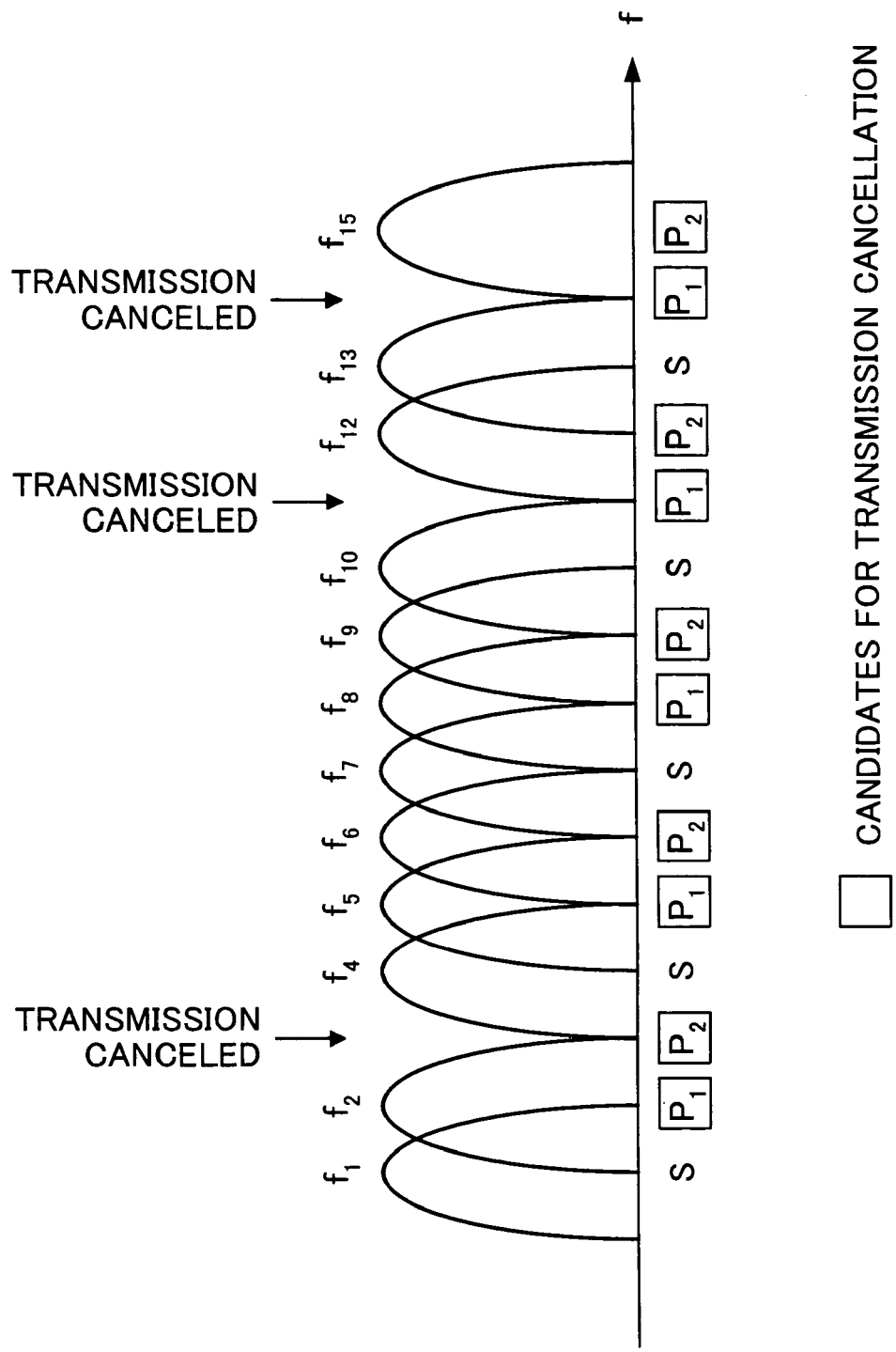
FIG. 22 illustrates subcarriers whose transmission is canceled according to Embodiment 6 of the present invention (at the time of first retransmission)
Figure 23:
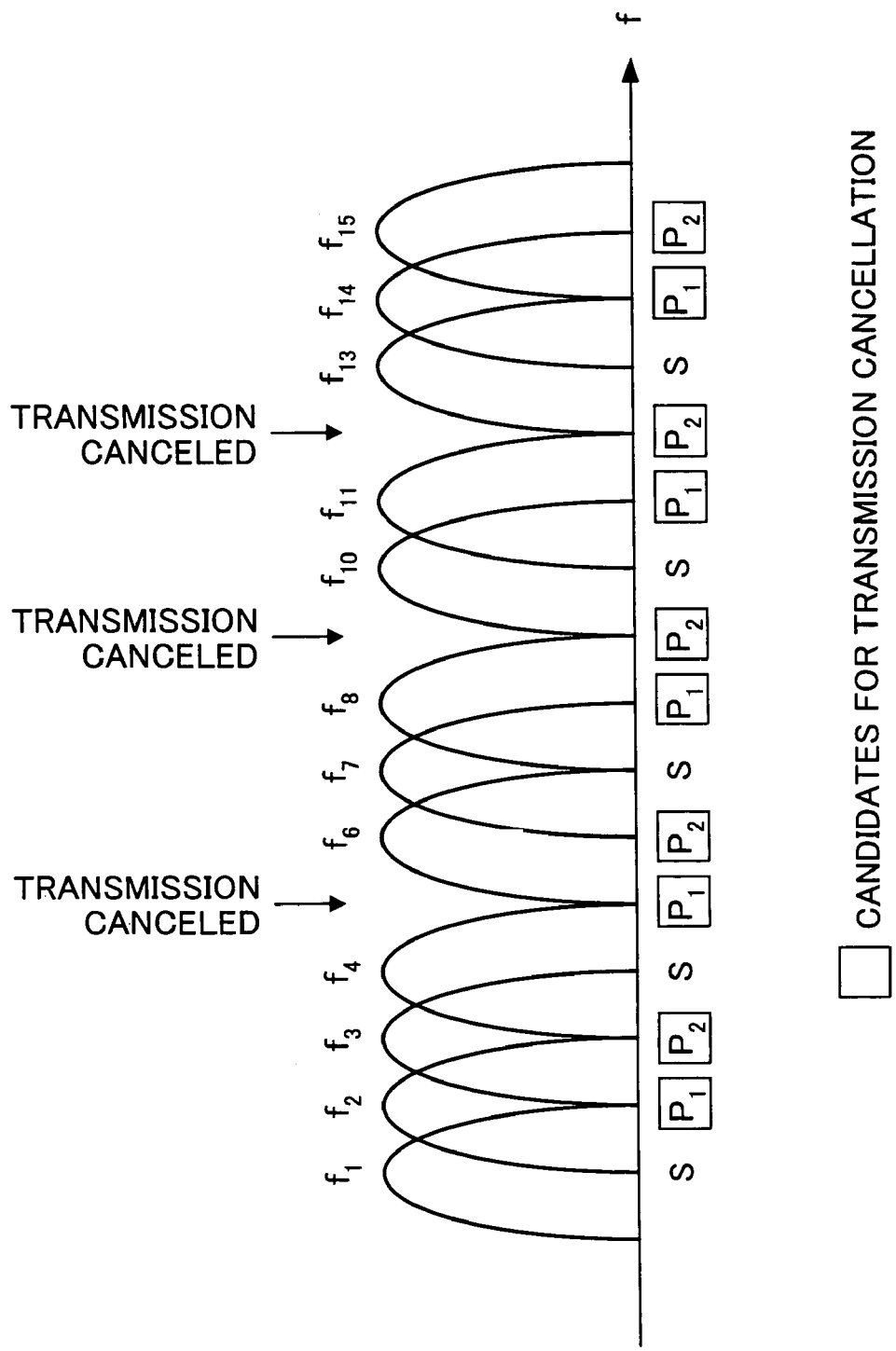
FIG. 23 illustrates subcarriers whose transmission is canceled according to Embodiment 6 of the present invention (at the time of second retransmission).

In FIG. 21 to FIG. 23, of subcarriers $f_1$ to $f_{15}$, subcarriers $f_2$, $f_3$, $f_5$, $f_6$, $f_8$, $f_9$, $f_{11}$, $f_{12}$, $f_{14}$ and $f_{15}$ to which parity bits are mapped are designated as candidates for transmission cancellation and of these L=10 candidates for transmission cancellation, transmission of N=3 subcarriers is canceled. The three subcarriers whose transmission is to be canceled are selected as follows. That is, when $f_2$, $f_6$ and $f_8$ are selected at the time of the initial transmission as subcarriers whose transmission is to be canceled (FIG. 21) if $f_2$, $f_6$ and $f_8$ are selected again at the time of the first retransmission, this means that the same subcarriers are not transmitted again. Therefore, at the time of the first retransmission, transmission of subcarriers $f_3$, $f_{11}$ and $f_{14}$ which are different from those at the time of the initial transmission is canceled (FIG. 22). All these subcarriers $f_3$, $f_{11}$ and $f_{14}$ are the subcarriers already transmitted at the time of the initial transmission. Furthermore, at the time of the second retransmission, transmission of subcarriers $f_5$, $f_9$ and $f_{12}$ which are different from those at the time of the initial transmission and at the time of the first retransmission is canceled (FIG. 23). Thus, the selection section 20 selects different subcarriers whose transmission is to be canceled between the time of the initial transmission and the time of retransmission, and, at the time of retransmission, selects the subcarriers whose transmission is to be canceled only from among the subcarriers already transmitted at the time of the initial transmission. Furthermore, when retransmission is carried out over a plurality of times, as long as there remain candidates for transmission cancellation whose transmission is not canceled yet, subcarriers whose transmission is to be canceled are selected from among the subcarriers whose transmission is not canceled yet.

Thus, this embodiment selects different subcarriers as subcarriers whose transmission is to be canceled between the time of the initial transmission and the time of retransmission, and, at the time of retransmission, selects the subcarriers whose transmission is to be canceled only from among the subcarriers already transmitted at the time of the initial transmission, and thereby preventing occurrence of subcarriers that are not transmitted even upon retransmission and reliably improving the error rate characteristics upon every retransmission.

As described above, the present invention allows a radio communication system which carries out error correction coding to suppress deterioration of its error rate characteristic and at the same time reduce peak power.

This application is based on the Japanese Patent Application No. 2002-266396 filed on Sep. 12, 2002, entire content of which is expressly incorporated by reference herein.

INDUSTRIAL APPLICABILITY

The present invention is preferably applicable to a radio communication terminal apparatus and radio communication base station apparatus, etc., used for a mobile communication system.

[FIG. 1]
TRANSMISSION DATA (BIT STRING)
12 CODING SECTION
14 P/S SECTION
16 MODULATION SECTION
18 S/P SECTION
24-1 CANCELLATION SECTION
24-2 CANCELLATION SECTION
24-K CANCELLATION SECTION
20 SELECTION SECTION
22 CANCELLATION TABLE
26 IFFT SECTION
28 P/S SECTION
30 GI SECTION
32 TRANSMISSION RF SECTION

[FIG. 2]
CANCELLATION SECTIONS 24-1 TO 24-K
FROM S/P SECTION 18
TO IFFT SECTION 26

[FIG. 3]
64 RECEPTION RF SECTION
66 GI SECTION
68 S/P SECTION
70 FFT SECTION
82 S/P SECTION
84 DECODING SECTION
RECEIVED DATA (BIT STRING)
72-1 CANCELLATION SECTION
72-2 CANCELLATION SECTION
72-K CANCELLATION SECTION
78 P/S SECTION
80 DEMODULATION SECTION
76 SELECTION SECTION
74 POWER MEASURING SECTION

Figure 4:
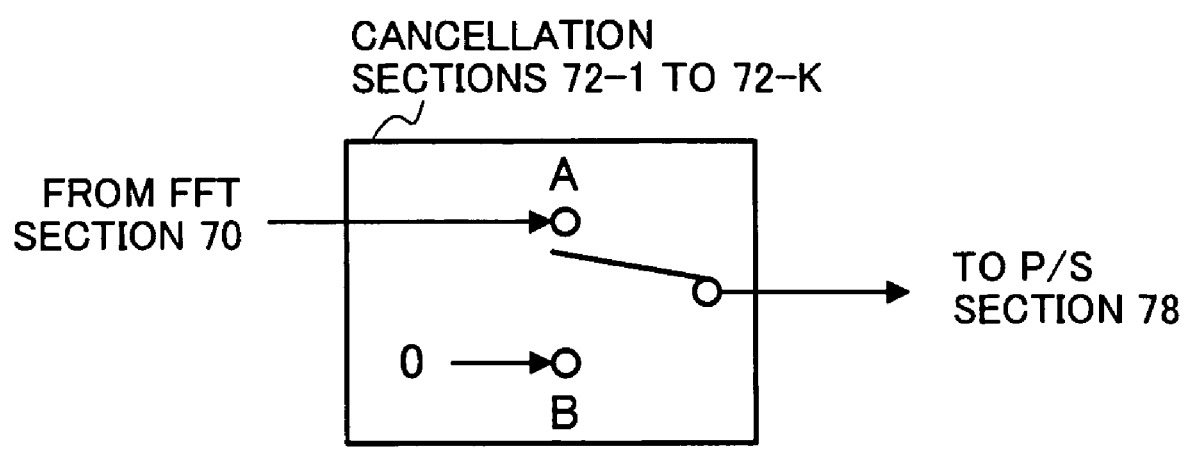
FIG. 4 is a block diagram showing a configuration of a cancellation section of the radio reception apparatus according to Embodiment 1 of the present invention.

[FIG. 4]
CANCELLATION SECTIONS 72-1 TO 72-K
FROM FFT SECTION 70
TO P/S SECTION 78

[FIG. 5]
K=15
CANDIDATES FOR TRANSMISSION CANCELLATION

[FIG. 6]
20 PATTERN
TRANSMISSION CANCELED

[FIG. 7]
TRANSMISSION CANCELED
TRANSMISSION CANCELED
TRANSMISSION CANCELED

TRANSMISSION CANCELED
TRANSMISSION CANCELED
CANDIDATES FOR TRANSMISSION CANCELLATION

[FIG. 8]
RECEPTION POWER

[FIG. 9]
RECEPTION POWER

[FIG. 10]
TRANSMISSION DATA (BIT STRING)
12 CODING SECTION
14 P/S SECTION
16 MODULATION SECTION
36 BUFFER
18 S/P SECTION
24-1 CANCELLATION SECTION
24-2 CANCELLATION SECTION
24-K CANCELLATION SECTION
20 SELECTION SECTION
26 IFFT SECTION
28 P/S SECTION
40 PEAK POWER DETECTION SECTION
38 BUFFER
30 GI SECTION
32 TRANSMISSION RF SECTION

[FIG. 11]
POWER
PEAK POWER
THRESHOLD
TIME
1 OFDM SYMBOL

[FIG. 12]
TRANSMISSION DATA (BIT STRING)
12 CODING SECTION
14 P/S SECTION
16 MODULATION SECTION
18 S/P SECTION
24-1 CANCELLATION SECTION
24-2 CANCELLATION SECTION
24-K CANCELLATION SECTION
20 SELECTION SECTION
22 CANCELLATION TABLE
42-1 POWER CONTROL SECTION
42-2 POWER CONTROL SECTION
42-K POWER CONTROL SECTION
26 IFFT SECTION
28 P/S SECTION
30 GI SECTION
32 TRANSMISSION RF SECTION

[FIG. 13]
TRANSMISSION DATA (BIT STRING)
12 CODING SECTION
14 P/S SECTION
44 PUNCTURING SECTION
46 INPUT ORDER CONTROL SECTION
16 MODULATION SECTION
18 S/P SECTION
24-1 CANCELLATION SECTION
24-2 CANCELLATION SECTION
24-K CANCELLATION SECTION
20 SELECTION SECTION
22 CANCELLATION TABLE
26 IFFT SECTION
28 P/S SECTION
30 GI SECTION
32 TRANSMISSION RE SECTION

[FIG. 14A]
PUNCTURING

[FIG. 14B]
REARRANGEMENT

[FIG. 14C]
S: SYSTEMATIC BIT
P: PARITY BIT

[FIG. 15]
TRANSMISSION CANCELED
TRANSMISSION CANCELED
TRANSMISSION CANCELED
CANDIDATES FOR TRANSMISSION CANCELLATION

[FIG. 16]
TRANSMISSION DATA (BIT STRING)
12 CODING SECTION
14 P/S SECTION
16 MODULATION SECTION
PILOT
18 S/P SECTION
24-1 CANCELLATION SECTION
24-2 CANCELLATION SECTION
24-K CANCELLATION SECTION
20 SELECTION SECTION
26 IFFT SECTION
28 P/S SECTION
30 GI SECTION
32 TRANSMISSION RE SECTION
50 DEMODULATION SECTION
48 RECEPTION RE SECTION

[FIG. 17]
64 RECEPTION RE SECTION
66 GI SECTION
68 S/P SECTION
70 FFT SECTION
82 S/P SECTION
84 DECODING SECTION
RECEIVED DATA (BIT STRING)
72-1 CANCELLATION SECTION
72-2 CANCELLATION SECTION
72-K CANCELLATION SECTION
78 P/S SECTION
80 DEMODULATION SECTION
76 SELECTION SECTION
88 TRANSMISSION RF SECTION
86 MODULATION SECTION
74 POWER MEASURING SECTION

[FIG. 18]
RECEPTION POWER
TRANSMISSION CANCELED
TRANSMISSION CANCELED
TRANSMISSION CANCELED
TRANSMISSION CANCELED
THRESHOLD
CANDIDATES FOR TRANSMISSION CANCELLATION

[FIG. 19]
64 RECEPTION RE SECTION
66 GI SECTION
68 S/P SECTION
70 FFT SECTION
82 S/P SECTION
84 DECODING SECTION

90 ERROR DETECTION SECTION
RECEIVED DATA (BIT STRING)
72-1 CANCELLATION SECTION
72-2 CANCELLATION SECTION
72-K CANCELLATION SECTION
78 P/S SECTION
80 DEMODULATION SECTION
76 SELECTION SECTION
74 POWER MEASURING SECTION
92 TRANSMISSION RE SECTION

[FIG. 20]
TRANSMISSION DATA (BIT STRING)
12 CODING SECTION
14 P/S SECTION
16 MODULATION SECTION
56 RETRANSMISSION CONTROL SECTION
18 S/P SECTION
24-1 CANCELLATION SECTION
24-2 CANCELLATION SECTION
24-K CANCELLATION SECTION
26 IFFT SECTION
28 P/S SECTION
30 GI SECTION
32 TRANSMISSION RE SECTION
20 SELECTION SECTION
58 SELECTION RESULT STORAGE SECTION
22 CANCELLATION TABLE
54 ACK/NACK DETECTION SECTION
52 RECEPTION RE SECTION

[FIG. 21]
TRANSMISSION CANCELED
TRANSMISSION CANCELED
TRANSMISSION CANCELED
CANDIDATES FOR TRANSMISSION CANCELLATION

[FIG. 22]
TRANSMISSION CANCELED
TRANSMISSION CANCELED
TRANSMISSION CANCELED
CANDIDATES FOR TRANSMISSION CANCELLATION

[FIG. 23]
TRANSMISSION CANCELED
TRANSMISSION CANCELED
TRANSMISSION CANCELED
CANDIDATES FOR TRANSMISSION CANCELLATION

What is claimed is:

1. A radio transmission apparatus comprising:
a coding section that encodes a transmission bit to generate a systematic bit and a parity bit;
a modulation section that modulates the systematic bit and the parity bit generated by said coding section to generate symbols each consisting of two or more bits;
a selection section that selects at least one subcarrier to which a symbol consisting of only parity bits is mapped out of the symbols generated by said modulation section;
a generating section that generates a multicarrier signal using subcarriers other than the subcarrier selected by said selection section; and
a transmission section that transmits the multicarrier signal generated by said generating section.

2. The radio transmission apparatus according to claim 1, further comprising a table showing the correspondence between a plurality of patterns of values that are possibly taken by the symbols generated by said modulation section and a plurality of selection patterns of subcarriers selected by said selection section as subcarriers to be excluded from transmission, wherein said selection section references said table based on the values of the symbols generated by said modulation section and selects a selection pattern with to minimum peak power out of said plurality of selection patterns.

3. The radio transmission apparatus according to claim 1, further comprising a detection section that detects peak power of the multicarrier signal generated by said generating section, wherein said selection section selects a selection pattern with to minimum power out of a plurality of selection patterns of the subcarriers to be excluded from transmission.

4. The radio transmission apparatus according to claim 1, further comprising a detection section that detects power of the multicarrier signal generated by said generating section, wherein said selection section carries out said selection processing only when the peak power reaches or exceeds a threshold.

5. The radio transmission apparatus according to claim 1, further comprising a detection section that detects peak power of the multicarrier signal generated by said generating section, wherein said transmission section transmits a multicarrier signal whose power is lower than a threshold out of the multicarrier signals generated by said generating section.

6. The radio transmission apparatus according to claim 1, further comprising a power control section that assigns power corresponding a power decrease that occurs when transmission of the subcarrier selected by said selection section is excluded to a subcarrier other than the subcarrier to be excluded from transmission.

7. The radio transmission apparatus according to claim 6, wherein:
said selection section selects N subcarriers of K subcarriers to which the symbols generated by said modulation section are mapped as subcarriers to be excluded from transmission, and
said power control section controls power of K–N subcarriers other than subcarriers to be excluded from transmission to the power multiplied by K/(K–N).

8. The radio transmission apparatus according to claim 1, further comprising an order control section that controls the order in which the systematic bit and the parity bit generated by said coding section are input to said modulation section so that a symbol consisting of only parity bits is generated.

9. The radio transmission apparatus according to claim 1, wherein said selection section selects, as the subcarrier to be excluded from transmission, a subcarrier to which a symbol consisting of only the parity bit out of the symbols generated by said modulation section is mapped and for which a pilot whose reception power measured by a radio reception apparatus that receives the multicarrier signal falls to or below a threshold.

10. The radio transmission apparatus according to claim 1, further comprising a retransmission section that retransmits the symbol generated by said modulation section, wherein at the time of retransmission by said retransmission section, said selection section selects a subcarrier different from the subcarrier at the time of initial transmission.

11. A radio reception apparatus comprising:
a reception section that receives the multicarrier signal transmitted from the radio transmission apparatus according to claim 1;
a measuring section that measures reception power of a plurality of subcarriers constituting the multicarrier signal received by said reception section; and
a selection section that selects subcarriers to be excluded from demodulation, said subcarriers to be excluded from demodulation selected up to a number of the subcarriers regarded as subcarriers to be excluded from transmission by said radio transmission apparatus from a subcarrier corresponding to a lowest reception power measured by said measuring section.

12. A radio transmission method in a radio transmission apparatus, the radio transmission method comprising the steps of:
   coding a transmission bit into a systematic bit and a parity bit;
   modulating the systematic bit and the parity bit to generate symbols each having two or more bits;
   selecting at least one subcarrier to which a symbol having only parity bits is assigned from a plurality of subcarriers; and
   transmitting a multicarrier signal including subcarriers other than the selected subcarrier.

13. A radio transmission apparatus comprising:
   a coding section operable to code a transmission bit into a systematic bit and a parity bit;
   a modulating section operable to modulate the systematic bit and the parity bit to generate symbols each having two or more bits;
   a selecting section operable to select at least one subcarrier to which a symbol having only parity bits is assigned from a plurality of subcarriers; and
   a transmitter operable to transmit a multicarrier signal including subcarriers other than the selected subcarrier.

* * * * *

UNITED STATES PATENT AND TRADEMARK OFFICE
CERTIFICATE OF CORRECTION

PATENT NO. : 7,583,736 B2
APPLICATION NO. : 10/516181
DATED : September 1, 2009
INVENTOR(S) : Kenichi Miyoshi et al.

It is certified that error appears in the above-identified patent and that said Letters Patent is hereby corrected as shown below:

On the title page of the Letters Patent: Item (54) and at Column 1, lines 1-4, Title, currently reads:

RADIO TRANSMISSION DEVICE, RADIO RECEPTION DEVICE, AND METHOD FOR SELECTING TRANSMISSION CANCELLATION SUBCARRIERS and should read:

RADIO TRANSMISSION APPARATUS, RADIO RECEPTION APPARATUS, AND METHOD OF SELECTING TRANSMISSION CANCELLATION SUBCARRIERS

Claim 2, column 18, lines 4-5, in the Letters Patent currently reads:

"selection pattern with to minimum peak power"

and should read:

"selection pattern with the minimum peak power"

Claim 3, column 18, lines 10-11, in the Letters Patent currently reads:

"selection pattern with to minimum power"

and should read:

"selection pattern with the minimum peak power"

Claim 4, column 18, line 14, in the Letters Patent currently reads:

"detection section that detects power"

and should read:

"detection section that detects peak power"

CERTIFICATE OF CORRECTION (continued)
U.S. Pat. No. 7,583,736 B2

Claim 5, column 18, lines 22-23, in the Letters Patent currently reads:

"multicarrier signal whose power"

and should read:

"multicarrier signal whose peak power"

Signed and Sealed this

Sixth Day of April, 2010

David J. Kappos
*Director of the United States Patent and Trademark Office*